(12) United States Patent
Hong et al.

(10) Patent No.: US 11,714,561 B2
(45) Date of Patent: Aug. 1, 2023

(54) SYSTEM, DEVICE AND METHOD FOR WRITING DATA TO PROTECTED REGION

(71) Applicant: SAMSUNG ELECTRONICS CO., LTD., Suwon-si (KR)

(72) Inventors: Hyunsook Hong, Hwaseong-si (KR); Jisoo Kim, Seongnam-si (KR); Yongsuk Lee, Gunpo-si (KR); Younsung Chu, Yongin-si (KR); Hyungsup Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/358,367

(22) Filed: Jun. 25, 2021

(65) Prior Publication Data

US 2022/0019356 A1    Jan. 20, 2022

(30) Foreign Application Priority Data

Jul. 17, 2020  (KR) ................. 10-2020-0089165
Dec. 16, 2020  (KR) ................. 10-2020-0176602

(51) Int. Cl.
*G06F 3/06* (2006.01)
*G06F 21/78* (2013.01)
*G06F 7/58* (2006.01)

(52) U.S. Cl.
CPC .......... *G06F 3/0622* (2013.01); *G06F 3/0637* (2013.01); *G06F 3/0659* (2013.01);
(Continued)

(58) Field of Classification Search
CPC .... G06F 3/0622; G06F 3/0637; G06F 3/0659; G06F 3/0673; G06F 7/588; G06F 21/30;
(Continued)

(56) References Cited

U.S. PATENT DOCUMENTS 9,984,007 B2   5/2018  Lee et al.
10,409,718 B2  9/2019  Choi
(Continued)

FOREIGN PATENT DOCUMENTS

KR   10-2015-0114363 A   10/2015
KR   10-2015-0139420 A   12/2015
(Continued)

OTHER PUBLICATIONS

Hsin-Jung Yang, Victor Costan, Nickolai Zeldovich, and Srinivas Devadas. 2013. Authenticated storage using small trusted hardware. In Proceedings of the 2013 ACM workshop on Cloud computing security workshop (CCSW '13). Association for Computing Machinery, New York, NY, USA, 35-46. (Year: 2013).*

(Continued)

*Primary Examiner* — Reginald G Bragdon
*Assistant Examiner* — Aaron D Ho
(74) *Attorney, Agent, or Firm* — Lee IP Law, P.C.

(57) ABSTRACT

A method of writing data to a protected region in response to a request from a host includes receiving a first write request including a first host message authentication code and a first random number from the host, verifying the first write request based on a write count, the first random number, and the first host message authentication code, updating the write count based on a result of verifying the first write request, generating a first device message authentication code based on the updated write count and the first random number, and providing the host with a first response including the first device message authentication code and a result of the verifying of the first write request.

16 Claims, 22 Drawing Sheets

(52) U.S. Cl.
CPC ............ *G06F 3/0673* (2013.01); *G06F 21/78* (2013.01); *G06F 7/588* (2013.01)

(58) Field of Classification Search
CPC .......... G06F 21/31; G06F 21/33; G06F 21/44; G06F 21/78; G06F 21/79; H04L 9/0861; H04L 9/0869
USPC ......................................................... 711/163
See application file for complete search history.

(56) References Cited

U.S. PATENT DOCUMENTS

| | | | |
|---|---|---|---|
| 10,452,384 B2 | 10/2019 | England | |
| 10,528,491 B2 | 1/2020 | Lee et al. | |
| 2009/0113117 A1* | 4/2009 | Dolgunov | G06F 21/64 711/163 |
| 2012/0331290 A1 | 12/2012 | Margolis et al. | |
| 2014/0223198 A1* | 8/2014 | Saranghar | G06F 13/14 713/193 |
| 2015/0089218 A1* | 3/2015 | Overby | H04L 63/0457 713/161 |
| 2015/0278118 A1* | 10/2015 | Lee | G06F 12/145 711/102 |
| 2015/0350206 A1* | 12/2015 | Shin | H04L 63/0876 713/170 |
| 2016/0034683 A1* | 2/2016 | Lee | G06F 9/4406 726/17 |
| 2019/0260799 A1 | 8/2019 | Chen et al. | |
| 2020/0014544 A1 | 1/2020 | Sela et al. | |
| 2020/0043559 A1 | 2/2020 | Blodgett et al. | |
| 2020/0210584 A1* | 7/2020 | Ficarra | G06F 21/54 |
| 2020/0272580 A1* | 8/2020 | Lu | G06F 12/1408 |
| 2022/0164293 A1* | 5/2022 | Pearson | G06F 12/1408 |

FOREIGN PATENT DOCUMENTS

| | | |
|---|---|---|
| KR | 10-2016-0017583 | 2/2016 |
| KR | 10-2017-0084467 A | 7/2017 |

OTHER PUBLICATIONS

J. Ahn, J. Lee, Y. Ko, D. Min, J. Park, S. Park, and Y. Kim. 2020. DISKSHIELD: A Data Tamper-Resistant Storage for Intel SGX. In Proceedings of the 15th ACM Asia Conference on Computer and Communications Security (ASIA CCS '20). Association for Computing Machinery, New York, NY, USA, 799-812. (Year: 2020).*

Yingwu Zhu and Yiming Hu, "SNARE: a strong security scheme for network-attached storage," 22nd International Symposium on Reliable Distributed Systems, 2003. Proceedings., 2003, pp. 250-259, doi: 10.1109/RELDIS.2003.1238075. (Year: 2003).*

James Hendricks, Gregory R. Ganger, and Michael K. Reiter. 2007. Low-overhead byzantine fault-tolerant storage. SIGOPS Oper. Syst. Rev. 41, 6 (Dec. 2007), 73-86. https://doi.org/10.1145/1323293.1294269 (Year: 2007).*

NVM Express Revision 1.2b, Jun. 3, 2016.

* cited by examiner

FIG. 2

| Byte Index | Fields | |
|---|---|---|
| 0-195 | Stuff Bytes | — 21 |
| MAC { 196-227 | Message Authentication Code | — 22 |
| 228-483 | Data | — 23 |
| 484-499 | Nonce | — 24 |
| 500-503 | Write Counter | — 25 |
| MSG { 504-505 | Address | — 26 |
| 506-507 | Block Count | — 27 |
| 508-509 | Result | — 28 |
| 510-511 | Message Type | — 29 |

20

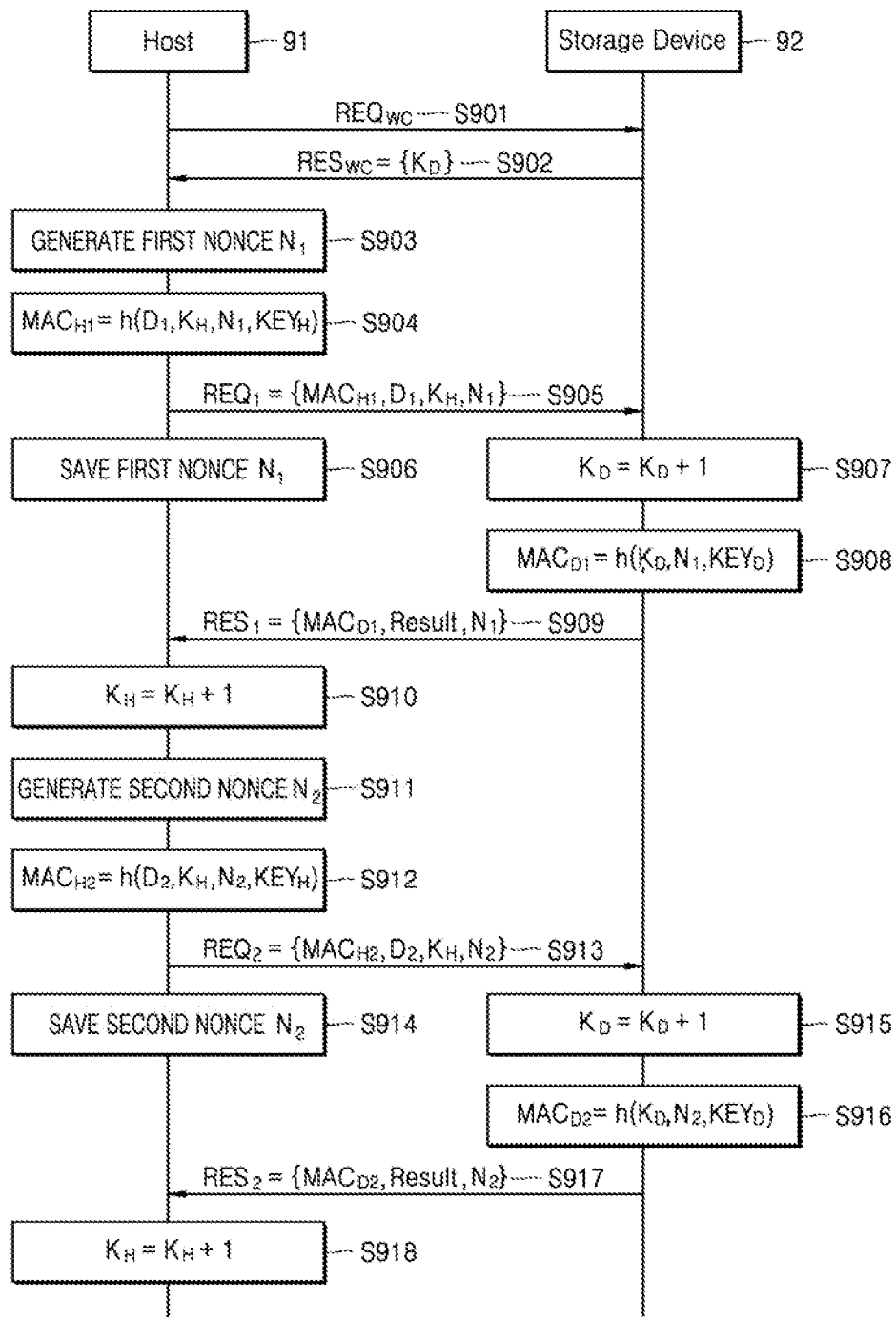

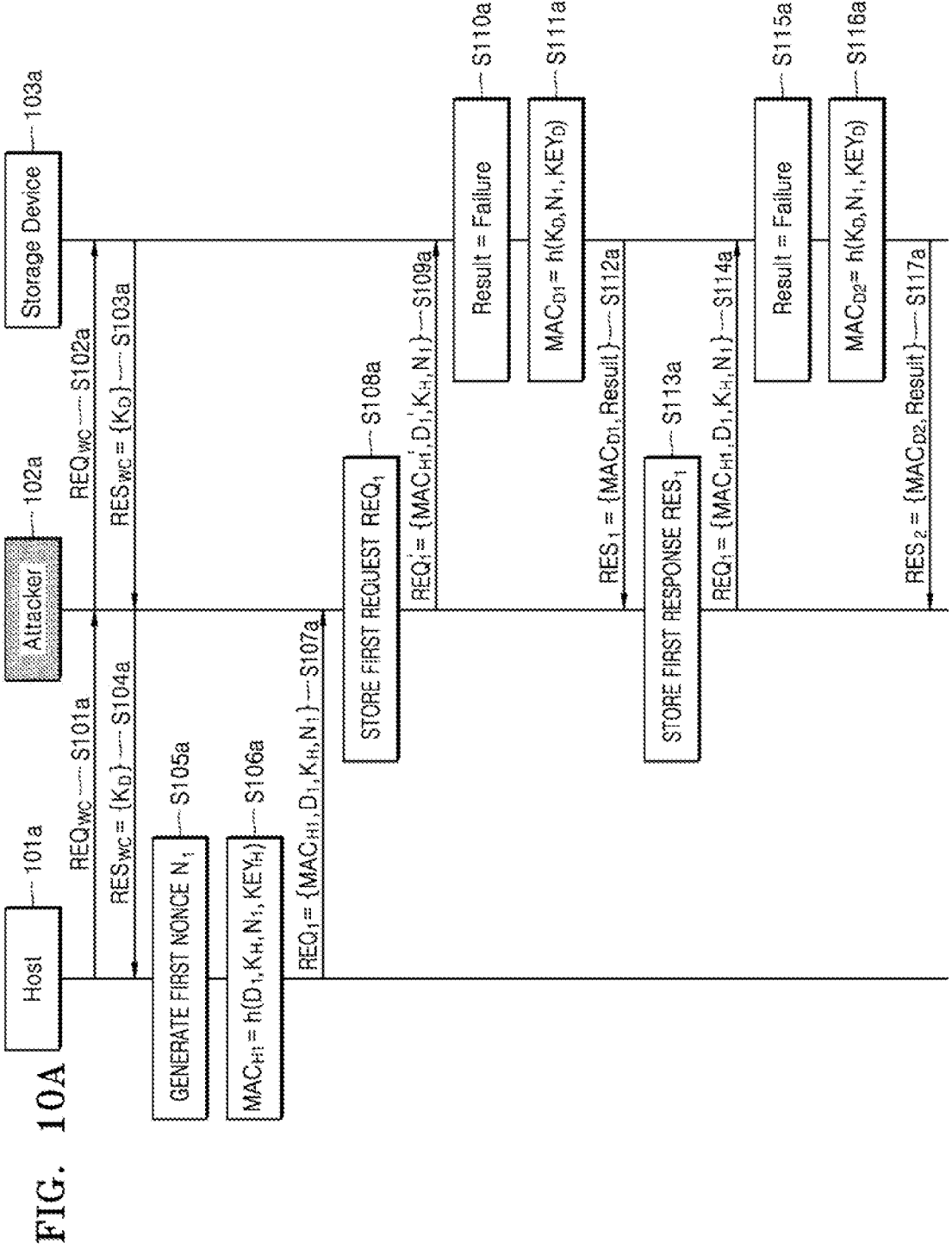

SYSTEM, DEVICE AND METHOD FOR WRITING DATA TO PROTECTED REGION

CROSS-REFERENCE TO RELATED APPLICATIONS

This application is based on and claims priority under 35 U.S.C. § 119 to Korean Patent Application No. 10-2020-0089165, filed on Jul. 17, 2020, and Korean Patent Application No. 10-2020-0176602, filed on Dec. 16, 2020, in the Korean Intellectual Property Office, the disclosures of which are incorporated by reference herein in their entirety.

BACKGROUND

1. Field

Embodiments relate to a storage device, and more particularly, to a system, device, and method for writing data to a protected region.

2. Description of the Related Art

Storage devices that store data may be used in various applications. Storage devices including memory devices manufactured by semiconductor processes have been widely used.

SUMMARY

Embodiments are directed to a method of writing data to a protected region in response to a request from a host, the method including: receiving a first write request including a first host message authentication code and a first random number from the host; verifying the first write request based on a write count, the first random number, and the first host message authentication code; updating the write count based on a result of verifying the first write request; generating a first device message authentication code based on the updated write count and the first random number; and providing the host with a first response including the first device message authentication code and a result of the verifying of the first write request.

Embodiments are also directed to a storage device configured to communicate with a host, the storage device including: a memory including a protected region; and a controller configured to receive a first write request including a first host message authentication code, a first write count, and a first random number from the host, verify the first write request based on a write count, the first random number, and the first host message authentication code, and write data included in the first write request to the protected region when the verifying of the first write request succeeds.

Embodiments are also directed to a method of writing data to a storage device including a protected region, the method including: generating a first host message authentication code based on a write count and a first random number; providing the storage device with a first write request including the first host message authentication code and the first random number; receiving a first response including a first device message authentication code from the storage device; verifying the first response based on an increment value from the write count, the first random number, and the first device message authentication code; and updating the write count based on a result of the verifying of the first response.

BRIEF DESCRIPTION OF THE DRAWINGS

Features will become apparent to those of skill in the art by describing in detail example embodiments with reference to the attached drawings in which:

FIG. 2 is a diagram of a message data frame according to an example embodiment;

FIG. 9 is a message diagram of a method of writing data to a protected region, according to an example embodiment;

FIGS. 10A and 10B are message diagrams of methods of writing data to a protected region, according to example embodiments;

DETAILED DESCRIPTION

Figure 1:
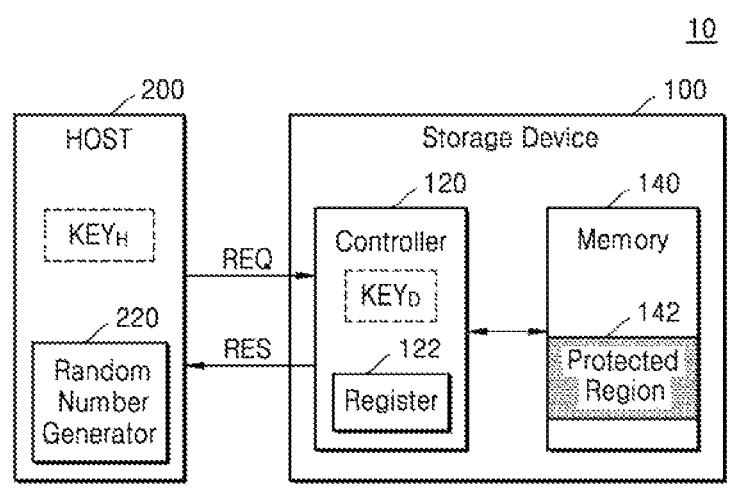
FIG. 1 is a block diagram of a system according to an example embodiment.

FIG. 1 is a block diagram of a system 10 according to an example embodiment. The system 10 may include a storage device 100 and a host 200, which communicate with each other. The system 10 may include, or be included in, a stationary system such as a desktop computer, a workstation, a server, a television, or a video game console; or a portable system such as a laptop computer, a tablet personal computer (PC), a mobile phone, an e-book, or a wearable device. In an example embodiment, the system 10 may be referred to as a storage system.

The host 200 may refer to a device that communicates with the storage device 100, and may also be referred to as a host device. The host 200 may include at least one programmable device such as a central processing unit (CPU), a digital signal processor (DSP), a graphics processing unit (GPU), or a neural-network processing unit (NPU); a reconfigurable device such as a field programmable gate array (FPGA); or a device, such as an intellectual property (IP) core, which provides a fixed function. The host 200 may include a host controller that performs operations described hereinbelow with reference to the drawings. The host controller may include at least one programmable device configured to execute software, at least one reconfigurable device, and/or at least one device that provides a fixed function.

The host 200 may communicate with the storage device 100 based on an interface. For example, the host 200 may communicate with the storage device 100 based on a serial advanced technology attachment (SATA) interface, a small computer small interface (SCSI), a peripheral component interconnect express (PCIe) interface, a universal serial bus (USB), a universal flash storage (UFS) interface, or an embedded multi-media card (eMMC) interface. Referring to FIG. 1, the host 200 may transmit a request REQ to the storage device 100 and receive a response RES from the storage device 100 based on an interface.

The host 200 may include a random number generator 220, and may provide the storage device 100 with a response RES including a random number generated by the random number generator 220. Thus, the request REQ may include a unique value (e.g., a nonce 24 of FIG. 2), and the host 200 may verify a response RES corresponding to the request REQ based on the unique value included in the request REQ. The storage device 100 may extract the unique value from the request REQ, and may verify the request REQ or generate the response RES based on the extracted unique value.

The storage device 100 may be a storage that includes a memory 140 storing data. For example, the storage device 100 may include an embedded device, which supports an embedded UFS (eUFS) or an eMMC, or may be detachably connected to the host 200 like a flash memory card, a compact flash (CF) card, a secure digital (SD) card, a micro-SD card, a mini-SD card, an extreme digital (xD) card, or a memory stick. Referring to FIG. 1, the storage device 100 may include a controller 120 and the memory 140.

The memory 140 may have a structure for storing data, and may be referred to as a memory device. The memory 140 may include non-volatile memory such as flash memory or resistive random access memory (RRAM). The storage device 100 may include a buffer including volatile memory such as dynamic RAM (DRAM). The storage device 100 may include a buffer-less or DRAM-less storage, which uses a portion of the memory 140 as a buffer. Referring to FIG. 1, the memory 140 may include a protected region 142. The protected region 142 may be managed by the controller 120, which is described below.

The controller 120 may control the memory 140 and may be referred to as a memory controller. Referring to FIG. 1, the controller 120 may receive the request REQ from the host 200, control the memory 140 based on the request REQ, and provide the response RES corresponding to the request REQ to the host 200. For example, when the host 200 requests a data write through the request REQ, the controller 120 may write data to the memory 140 based on an address included in the request REQ, and provide the response RES, which indicates completion of the data write, to the host 200. When the host 200 requests a data read through the request REQ, the controller 120 may read data from the memory 140 based on an address included in the request REQ, and provide the response RES including the data to the host 200.

The controller 120 may define the protected region 142 as a portion of the memory 140. The protected region 142 may correspond to a replay protected memory block (RPMB) defined in UFS. The controller 120 may permit only authenticated access to the protected region 142, and thus the host 200 may store data that is intended to be secure, i.e., secure data, in the protected region 142 and may read the secure data from the protected region 142. The storage device 100 and the host 200 may share an authentication key with each other in advance, and authenticate the request REQ and/or the response RES by using the authentication key. For example, referring to FIG. 1, the controller 120 may use a device key $KEY_D$, and the device key $KEY_D$ may be stored in a space which is accessible by only the controller 120, e.g., in a portion of the protected region 142. Similarly, the host 200 may use a host key $KEY_H$, and the host key $KEY_H$ may be stored in a space that is accessible by only the host 200 (or the host controller). Herein, operations performed by the controller 120 may be simply referred to as being performed by the storage device 100.

The device key $KEY_D$ and the host key $KEY_H$ may be respectively provisioned to the storage device 100 and the host 200. The device key $KEY_D$ and the host key $KEY_H$ may be respectively provisioned during the manufacture of the storage device 100 and during the manufacture of the host 200. The device key $KEY_D$ may be provisioned to the storage device 100 by the request REQ of the host 200. The device key $KEY_D$ that has been provisioned may not be rewritten and read. In an example embodiment, the device key $KEY_D$ may be identical to the host key $KEY_H$.

The controller 120 may include a register 122. The register 122 may include a write count (or a write counter). The controller 120 may count a write operation performed on the protected region 142 in response to a write request to the protected region 142. The host 200 may provide the request REQ (i.e., a write count read request) to read a current write count to the storage device 100, and the controller 120 may read the write count stored in the register 122 and provide the response RES including the write count to the host 200. The host 200 may provide the request REQ to write data, i.e., a write request, to the storage device 100, and the request REQ may include a write count. When the write count included in the request REQ is different from a current write count, i.e., the write count stored in the register 122, the controller 120 may determine a failure of the verification of the request REQ. Herein, a write count that is managed by the host 200 may be referred to as a host write count, and a write count that is managed by the storage device 100, i.e., the controller 120, may be referred to as a device write count.

Even though the storage device 100 and the host 200 authenticate access to the protected region 142 by using the write count, the device key $KEY_D$, and the host key $KEY_H$, various attacks may be made on the system 10 in an attempt to obtain and/or change data stored in the protected region 142 or to insert an error in access to the protected region 142. For example, as described with reference to FIGS. 3A and 3B below, an attack may be made to insert an error in access of writing data to the protected region 142. This attack may cause a serious error in the system 10. As described below, the host 200 may generate a request REQ to write data based on the random number generated by the random number generator 220. The storage device 100 may verity the request REG based on the random number included in the request REQ, and may provide a response RES corresponding to the request REQ to the host 200. The host 200 may identify whether the operation requested by the request REQ, i.e., a write operation, has been successfully completed, by verifying the response RES based on the random number used to generate the request REQ. Thus, a man-in-the-middle (MITM) attack may be effectively detected by the storage device 100 and the host 200, error insertion by the MITM attack may be prevented, and the security of the protected region 142 may be enhanced. In addition, a change in an interface between the storage device 100 and the host 200 may be unnecessary or minimized, and thus the security of the protected region 142 may be further efficiently and easily enhanced.

FIG. 2 is a diagram of a message data frame 20 according to an example embodiment. In the present example embodiment, the message data frame 20 of FIG. 2 refers to an RPMB message data frame of UFS. The request REQ and the response RES for access to the protected region 142 in FIG. 1 may have the message data frame 20 in common. Referring to FIG. 2, the message data frame 20 may include a plurality of fields 21 through 29. FIG. 2 will now be described with additional reference to FIG. 1.

Referring to FIG. 2, the message data frame 20 may be 512 bytes in length. A stuff bytes field 21, which indicates the start of the message data frame 20 and is 196 bytes in length, may be at the front of the message data frame 20. The message data frame 20 may sequentially include a message authentication code (MAC) field 22, a data field 23, a nonce field 24, a write count field (or a write counter field) 25, an address field 26, a block count field 27, a result field 28, and a message type field 29, following the stuff bytes field 21. As described below, the data field 23, the nonce field 24, the write count field 25, the address field 26, the block count field 27, the result field 28, and the message type field 29 may be used together with an authentication key to generate the message authentication code field 22, and may be collectively referred to as a message MSG. Each of the request REQ and the response RES may be referred to as including a message authentication code MAC and the message MSG. Herein, the nonce field 24 and the write count field 25 from among the fields included in the message MSG will be mainly illustrated and described, and illustrations and descriptions of the other fields of the message MSG may be omitted.

The message authentication code field 22 may be 32 bytes in length and may be included in each of the request REQ and the response RES. The message authentication code field 22 may have a value that is used to verify the message data frame 20, i.e., the request REQ and the response RES. For example, the host 200 may generate the message authentication code MAC (which may be referred to as a host message authentication code) to be included in the request REQ based on the message MSG (which may be referred to as a host message herein) to be included in the request REQ and the host key $KEY_H$. The storage device 100 may verify the message authentication code MAC (i.e., the host message authentication code) included in the request REQ based on the message MSG (i.e., the host message) included in the request REQ and the device key $KEY_D$. Similarly, the storage device 100 may generate the message authentication code MAC (which may be referred to as a device message authentication code herein) to be included in the response RES based on the message MSG (which may be referred to as a device message herein) to be included in the response RES and the device key $KEY_D$. The host 200 may verify the message authentication code MAC (i.e., the device message authentication code) included in the response RES based on the message MSG (i.e., the device message) included in the response RES and the host key $KEY_H$. The message authentication code field 22 may be used to transmit an authentication key having a 32-byte length in an authentication key programming request (message type=0001 h).

The message authentication code MAC may be generated from an authentication key and the message MSG based on a hash function, and may be referred to as a hash message authentication code (HMAC). Each of the storage device 100 and the host 200 may generate the message authentication code MAC from an authentication key and concatenation (i.e., bytes [228:511]) of the fields of the message MSG based on a hash function, such as Message-Digest algorithm 5 (MD5), Secure Hash Algorithm 1 (SHA-1), or SHA-256, and may include a hash engine that implements the hash function.

The data field 23 may be 256 bytes in length and may be included in each of the request REQ and the response RES. For example, the data field 23 included in the request REQ may correspond to data that is to be written to the storage device 100, and the data field 23 included in the response RES may correspond to data read from the storage device 100. The nonce field 24 may have a 16-byte length, may be included in each of the request REQ and the response RES, and may include a random number generated by the host 200. The write count field 25 may have a 4-byte length, may be included in each of the request REQ and the response RES, and may include a value that results from counting write operations on the protected region 142. The nonce field 24 and the write count field 25 may be used together with the message authentication code field 22 to verify the message data frame 20.

The address field 26 may have a 2-byte length, may be included in each of the request REQ and the response RES, and may include a value that indicates a portion of the protected region 142 to which the data field 23 is written or from which the data field 23 is read. The block count field 27 may have a 2-byte length, may be included in each of the request REQ and the response RES, and may include the number of 256-byte logical blocks requested to be read or programmed. The result field 28 may have a 2-byte length, may be included in the response RES, and may include a value that indicates a result of an operation.

The message type field 29 may have a 2-byte length and may be included in each of the request REQ and the response RES. The message type field 29 included in the request REQ may be referred to as a request message type and may have a value that defines a request. For example, the request message type may include a value that indicates one of an authenticate key programming request, a write count read request, an authenticated data write request, an authenticated data read request, a result read request, a secure write protection configuration block write request, and a secure write protection configuration block read request. A response message type may include a value that indicates one of an authenticate key programming response, a write count read response, an authenticated data write response, an authenticated data read response, a secure write protection configuration block write response, and a secure write protection configuration block read response.

Figure 3A:
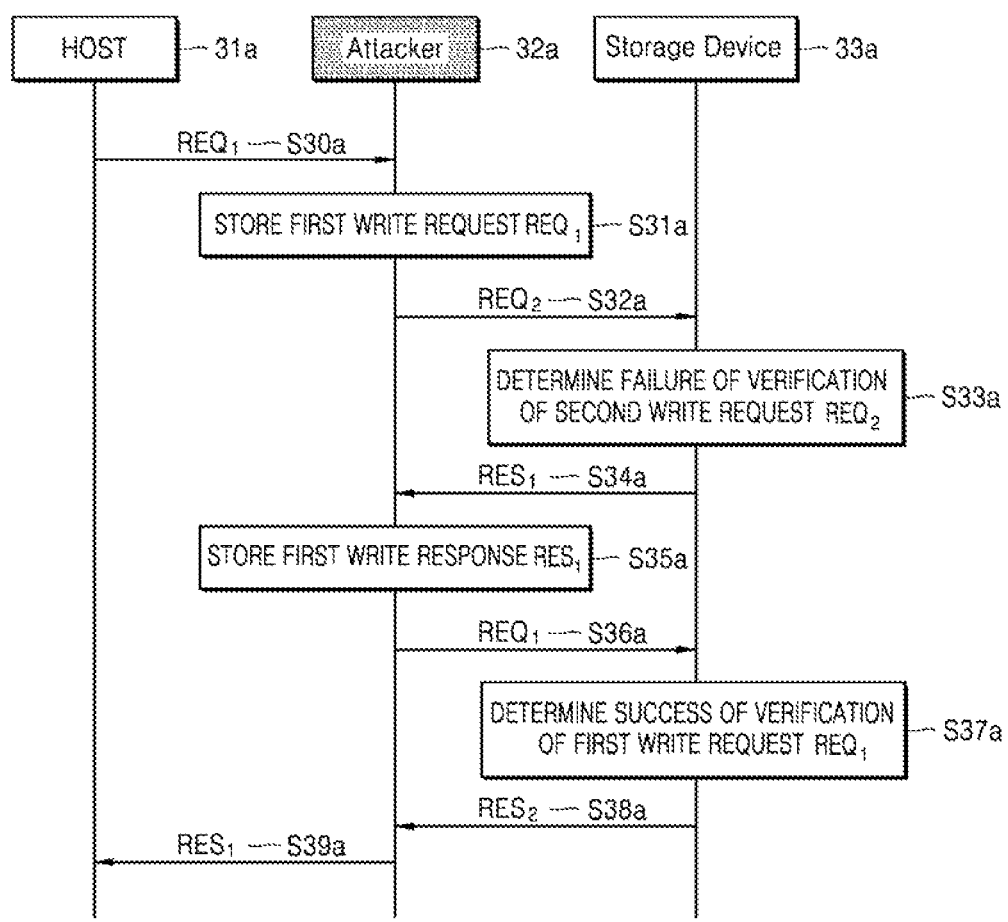
FIGS. 3A and 3B are message diagrams illustrating examples of attacks.
Figure 3B:
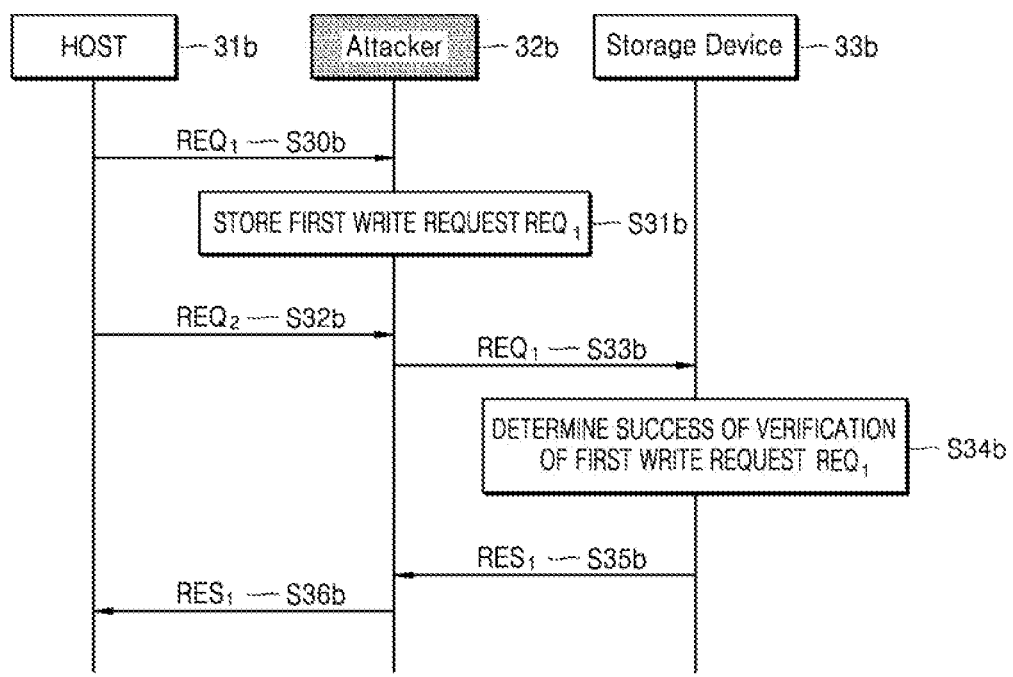

FIGS. 3A and 3B are message diagrams illustrating examples of MITM attacks. An attacker 32a may be between a host 31a and a storage device 33a, referring to FIG. 3A. An attacker 32b may be between a host 31b and a storage device 33b, referring to FIG. 3B. It is assumed in FIGS. 3A and 3B that requests are write requests with respect to a protected region and that a response is generated in response to a write request without a separate request (e.g., a result read request). Hereinafter, redundant descriptions will be omitted.

Referring to FIG. 3A, the host 31a may include at least one processor that executes software including an operating system (OS) and applications executed on the OS. The OS may include a device driver that provides an interface with the storage device 33a to an application. The attacker 32a may be in the form of software in the device driver, or between the device driver and the storage device 33a, and may initiate a relay attack as described below.

In operation S30a, the host 31a may issue a first write request $REQ_1$ and the attacker 32a may receive the first write request $REQ_1$. As described with reference to FIG. 2, the first write request $REQ_1$ may include a plurality of fields, and a message type field from among the plurality of fields may have a value (for example, 0003h) corresponding to a write request. In operation S31a, the attacker 32a may store the first write request $REQ_1$, which was provided by the host 31a in operation S30a, and may provide the first write request $REQ_1$ to the storage device 33a in operation S36a, which is described below.

In operation S32a, the attacker 32a may provide a second write request $REQ_2$ to the storage device 33a. The attacker 32a may generate the second write request $REQ_2$, which is different from the first write request $REQ_1$, to obtain a response indicating a failure of verification of write request, i.e., a first response $RES_1$ in operation S34a, and may provide the second write request $REQ_2$ to the storage device 33a. For example, the attacker 32a may generate the second write request $REQ_2$ by changing at least one field included in the first write request $REQ_1$, e.g., the message authentication code MAC and/or the data field.

In operation S33a, the storage device 33a may determine a failure of verification of the second write request $REQ_2$. For example, the storage device 33a may compare a message verification code generated based on the device key $KEY_D$ and at least one field included in the second write request $REQ_2$, with the message authentication code MAC included in the second write request $REQ_2$, and may identify that the second write request $REQ_2$ is not an authenticated request due to the discrepancy between the message verification code and the message authentication code MAC.

In operation S34a, the storage device 33a may issue a first response $RES_1$ indicating the failure of the verification of the second write request $REQ_2$, and the attacker 32a may receive the first response $RES_1$. In operation S35a, the attacker 32a may store the first response $RES_1$, which is provided from the storage device 33a in operation S34a, and provide the first response $RES_1$ to the host 31a in operation S39a, which is described below.

In operation S36a, the attacker 32a may provide the first write request $REQ_1$ to the storage device 33a. The attacker 32a may provide the storage device 33a with the first write request $REQ_1$, which been stored in operation S31a, without changes.

In operation S37a, the storage device 33a may determine a success of verification of the first write request $REQ_1$. Because the first write request $REQ_1$ provided from the attacker 32a in operation S36a is identical to that issued by the host 31a in operation S30a, the storage device 33a may identify the first write request $REQ_1$ as an authenticated request. Thus, data included in the first write request $REQ_1$ may be normally written to the storage device 33a.

In operation S38a, the storage device 33a may issue a second response $RES_2$ indicating the success of the verification of the first write request $REQ_1$, and the attacker 32a may receive the second response $RES_2$ from the storage device 33a. In operation S39a, the attacker 32a may provide the first response $RES_1$ to the host 31a. The attacker 32a may provide the host 31a with the first response $RES_1$, which indicates the failure of the verification of the second write request $REQ_2$ and has been stored in operation S35a, instead of the second response $RES_2$ indicating the success of the verification of the first write request $REQ_1$. Thus, the host 31a may identify that a write operation requested by the first write request $REQ_1$ issued in operation S30a has failed, and the storage device 33a may normally store the data requested to be written by the first write request $REQ_1$. Thus, the host 31a may identify a state that is different from the real state of the storage device 33a, because of the attacker 32a, and an error may occur in a system including the host 31a and the storage device 33a.

Referring to FIG. 3B, in operation S30b, the host 31b may issue the first write request $REQ_1$ and the attacker 32b may receive the first write request $REQ_1$. In operation S31b, the attacker 32b may store the first write request $REQ_1$. The attacker 32b may store the first write request $REQ_1$ provided by the host 31b in operation S30b, and provide the first write request $REQ_1$ to the storage device 33b in operation S33b, which is described below. Referring to FIG. 3B, the attacker 32b may not provide any write request to the storage device 33b after storing the first write request $REQ_1$.

In operation S32b, the host 31b may issue the second write request $REQ_2$ and the attacker 32b may receive the second write request $REQ_2$. For example, the host 31b may issue the second write request $REQ_2$, which includes second data that is different from first data included in the first write request $REQ_1$.

In operation S33b, the attacker 32b may provide the first write request $REQ_1$ to the storage device 33b. The attacker 32b may provide the storage device 33b with the first write request $REQ_1$, which has been stored in operation S31b, without changes, instead of the second write request $REQ_2$ received in operation S32b to write the second data.

In operation S34b, the storage device 33b may determine a success of verification of the first write request $REQ_1$. Because the first write request $REQ_1$ provided from the attacker 32b in operation S33b is identical to that issued by the host 31b in operation S30b, the storage device 33b may identify the first write request $REQ_1$ as an authenticated request. Thus, the first data included in the first write request $REQ_1$ may be normally written to the storage device 33b.

In operation S35b, the storage device 33b may issue the first response $RES_1$ indicating the success of the verification of the first write request $REQ_1$, and the attacker 32b may receive the first response $RES_1$ from the storage device 33b. In operation S36b, the attacker 32b may provide the first response $RES_1$ to the host 31b. Thus, the host 31b may identify that a write operation of the second data requested by the second write request $REQ_2$ issued in operation S32b has succeeded, while the storage device 33b may store the first data, which is requested to be written by the first write request $REQ_1$. Thus, the host 31b may identify a state that is different from the real state of the storage device 33b, because of the attacker 32b, and an error may occur in a system including the host 31b and the storage device 33b.

Figure 4:
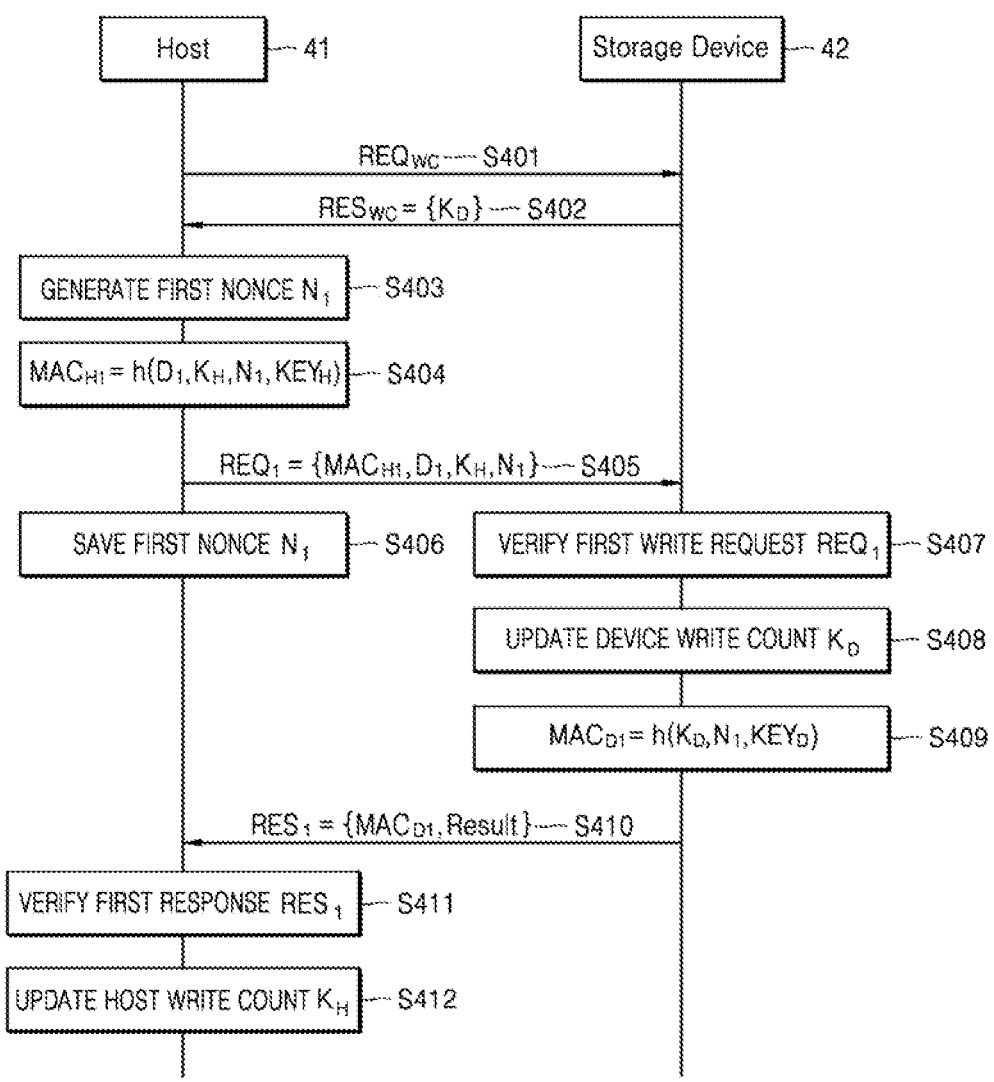
FIG. 4 is a message diagram of a method of writing data to a protected region, according to an example embodiment.

FIG. 4 is a message diagram of a method of writing data to a protected region, according to an example embodiment. Compared with FIGS. 3A and 3B, a write request of FIG. 4 may include a random number, which may be referred to as a nonce.

Referring to FIG. 4, in operation S401, a host 41 may provide a write count read request $REQ_{WC}$ to a storage device 42. For example, a message type field among a plurality of fields included in the write count read request $REQ_{WC}$ may have a value (e.g., 0002 h) corresponding to a write count read request.

In operation S402, the storage device 42 may provide a write count read response $RES_{WC}$ to the host 41. For example, a message type field among a plurality of fields included in the write count read response $RES_{WC}$ may have a value (e.g., 0200 h) corresponding to a write count read response, and a read count may have a device write count $K_D$. The host 41 may set a host write count $K_H$ to be the device write count $K_D$ included in the write count read response $RES_{WC}$.

In operation S403, the host 41 may generate a first nonce $N_1$. For example, the host 41 may generate the first nonce $N_1$ corresponding to a random number generated by a random number generator. The first nonce $N_1$ may be different from a nonce included in a previously issued write request.

In operation S404, the host 41 may generate a first host message authentication code $MAC_{H1}$. For example, referring to FIG. 4, the host 41 may generate the first host message authentication code $MAC_{H1}$ from first data $D_1$, the host write count $K_H$, the first nonce $N_1$, and the host key $KEY_H$ based on a hash function h. Thus, the first host message authentication code $MAC_{H1}$ may depend on the first nonce $N_1$ generated in operation S403.

In operation S405, the host 41 may provide a first request $REQ_1$ to the storage device 42. For example, a message type field among a plurality of fields included in the first request $REQ_1$ may have a value (e.g., 0003 h) corresponding to an authenticated data write request. Referring to FIG. 4, the first request $REQ_1$ may include the first host message authentication code $MAC_{H1}$, the first data $D_1$, the host write count $K_H$, and the first nonce $N_1$. The first request $REQ_1$ may be a write request for requesting a write of the first data $D_1$ to a protected region, and the host write count $K_H$ included in the first request $REQ_1$ may be identical to the device write count $K_D$ received from the storage device 42 in operation S402.

In operation S406, the host 41 may save the first nonce $N_1$. As described below, the storage device 42 may use the first nonce $N_1$ to generate a response corresponding to the first request $REQ_1$, i.e., the first response $RES_1$ of operation S410. The host 41 may save the first nonce $N_1$ to verify the first response $RES_1$. The host 41 may store the first nonce $N_1$ in a secure register.

In operation S407, the storage device 42 may verify the first request $REQ_1$. For example, the storage device 42 may verify the first request $REQ_1$ based on the device key $KEY_D$ and the first host message authentication code $MAC_{H1}$, the first data $D_1$, the host write count $K_H$, and the first nonce $N_1$ included in the first request $REQ_1$. The storage device 42 may verify the first request $REQ_1$ based on not only the host write count $K_H$ but also the first nonce $N_1$, and thus a MITM attack may be detected, as is described in further detail with reference to FIGS. 10A and 10B. When the verification of the first request $REQ_1$ has succeeded, the storage device 42 may write the first data $D_1$ to the protected region. An example of operation S407 is described with reference to FIG. 5.

In operation S408, the storage device 42 may update the device write count $K_D$. The storage device 42 may update the device write count $K_D$ based on a result of the verification of the first request $REQ_1$ in operation S407, and thus the device write count $K_D$ may be maintained or changed. An example of operation S408 is described with reference to FIG. 6.

In operation S409, the storage device 42 may generate a first device message authentication code $MAC_{D1}$. For example, referring to FIG. 4, the storage device 42 may generate the first device message authentication code $MAC_{D1}$ from the device write count $K_D$, the first nonce $N_1$, and the device key $KEY_D$, based on the hash function h. The device write count $K_D$, which is used to generate the first device message authentication code $MAC_{D1}$, may have a value updated in operation S408.

In operation S410, the storage device 42 may provide the first response $RES_1$ to the host 41. For example, a message type field among a plurality of fields included in the first response $RES_1$ may have a value (e.g., 0300 h) corresponding to an authenticated data write response. Referring to FIG. 4, the first response $RES_1$ may include the first device message authentication code $MAC_{D1}$ generated in operation S409. The first response $RES_1$ may also include a result having a value corresponding to a success or a failure according to the result of the verification of the first request $REQ_1$ in operation S407.

In operation S411, the host 41 may verify the first response $RES_1$. For example, the host 41 may verify the first response $RES_1$ based on the host key $KEY_H$, the first nonce $N_1$, the host write count $K_H$, and the first device message authentication code $MAC_{D1}$. The host 41 may use an increment value of the host write count $K_H$ during the verification of the first response $RES_1$. The host 41 may verify the first response $RES_1$ based on the first nonce $N_1$ saved in operation S406, and thus a MITM attack may be detected, as described in further detail with reference to FIGS. 10A and 10B. When the verification of the first response $RES_1$ has succeeded, the host 41 may rely on the result included in the first response $RES_1$. On the other hand, when the verification of the first response $RES_1$ has failed, the host 41 may not rely on the result included in the first response $RES_1$. An example of operation S411 is described with reference to FIG. 7.

In operation S412, the host 41 may update the host write count $K_H$. For example, the host 41 may update the host write count $K_H$ based on a result of the verification of the first response $RES_1$ in operation S411, and thus the host write count $K_H$ may be maintained or changed. An example of operation S412 is described with reference to FIG. 8.

Figure 5:
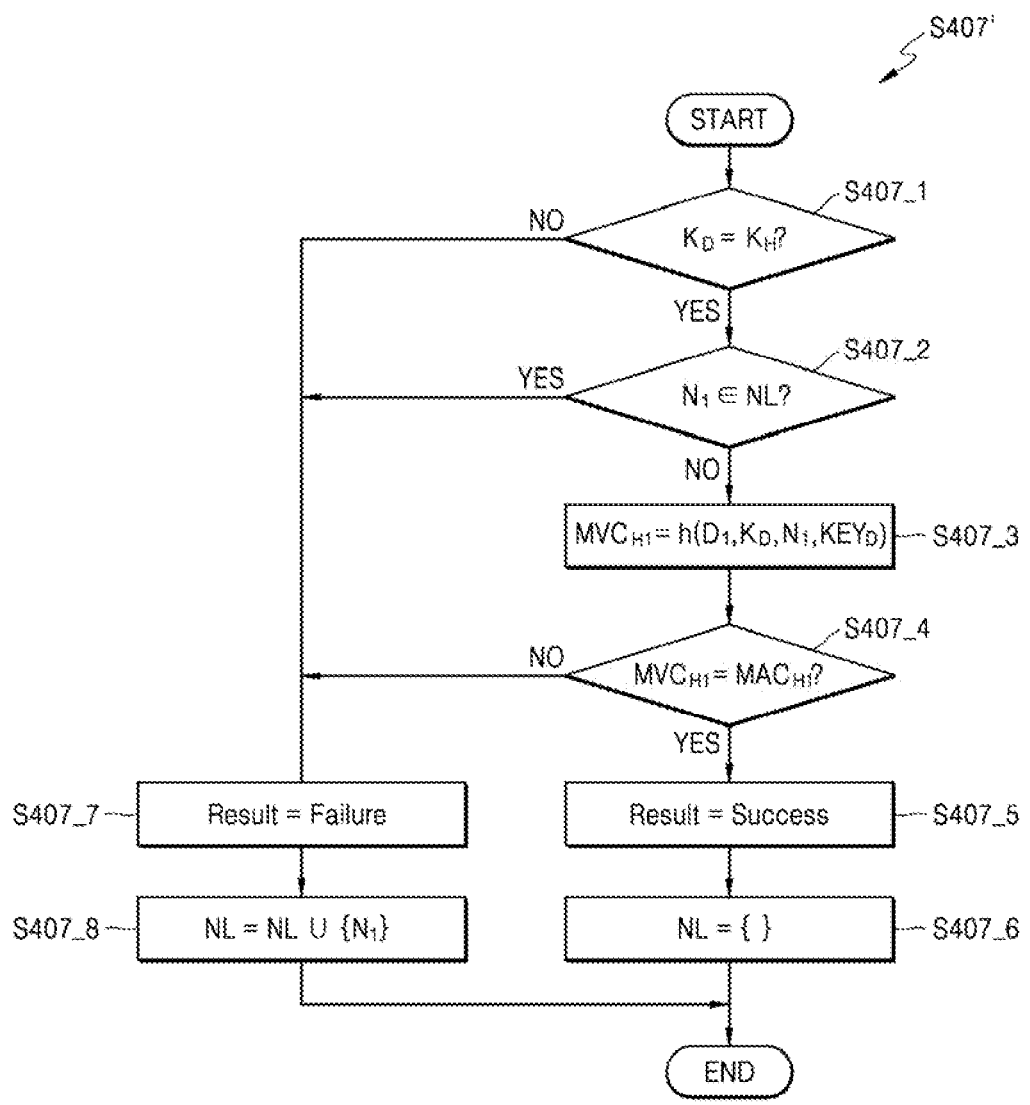
FIG. 5 is a flowchart of a method of writing data to a protected region, according to an example embodiment.

FIG. 5 is a flowchart of a method of writing data to a protected region, according to an example embodiment. In detail, the flowchart of FIG. 5 illustrates operation S407' as an example of operation S407 of FIG. 4 of the storage device 42 verifying the first request $REQ_1$. Referring to FIG. 5, operation S407' may include a plurality of operations S4071, S407_2, S407_3, S407_4, S407_5, and S407_6. Operation S407' of FIG. 5 may be performed by the storage device 42 of FIG. 4. FIG. 5 will now be described with additional reference to FIG. 4.

Referring to FIG. 5, in operation S4071, the device write count $K_D$ may be compared with the host write count $K_H$. For example, the storage device 42 may compare the host write count $K_H$ included in the first request $REQ_1$ received from the host 41 with the device write count $K_D$, which is managed by the storage device 42. Referring to FIG. 5, when the device write count $K_D$ is identical to the host write count $K_H$, operation S407_2 may be performed subsequently. On the other hand, when the device write count $K_D$ is different from the host write count $K_H$, a failure of the verification of the first write request $REQ_1$ may be determined, and operations S407_7 and S407_8 may be performed subsequently.

In operation S407_2, it may be determined whether a nonce list NL includes the first nonce $N_1$. As described with reference to FIGS. 1 and 4, the host 41 may generate a random number when generating a write request, and may include a nonce corresponding to the random number, and thus the write request may have a nonce of a unique value.

The storage device 42 may collect nonces included in a request when verification of the request fails, and may manage a nonce list NL including the collected nonces. The storage device 42 may store the nonce list NL in a memory device (for example, RAM) included in a controller (for example, the controller 120 of FIG. 1) and/or a partial region (for example, the protected region 142 of FIG. 1) of a memory. When the nonce list NL includes a nonce identical to the first nonce $N_1$, the storage device 42 may identify that the first request $REQ_1$ is invalid. Thus, referring to FIG. 5, when the first nonce $N_1$ is not included in the nonce list NL, operation S407_3 may be performed subsequently. On the other hand, when the first nonce $N_1$ is included in the nonce list NL, a failure of verification of the first write request $REQ_1$ may be determined, and operations S407_7 and S407_8 may be performed subsequently.

In operation S407_3, a first host message verification code $MVC_{H1}$ may be generated. For example, referring to FIG. 5, the storage device 42 may generate the first host message verification code $MVC_{H1}$ from the first data $D_1$, the device write count $K_D$, the first nonce $N_1$, and the device key $KEY_D$, based on the hash function h. The storage device 42 may extract the first data $D_1$ and the first nonce $N_1$ from the first request $REQ_1$, and may generate the first host message verification code $MVC_{H1}$ based on not only the extracted first data $D_1$ and the extracted first nonce $N_1$, but also the device write count $K_D$ and the device key $KEY_D$.

In operation S407_4, the first host message verification code $MVC_{H1}$ and the first host message authentication code $MAC_{H1}$ may be compared with each other. When the first data $D_1$, the host write count $K_H$, the first nonce $N_1$, and the host key $KEY_H$ used by the host 41 to generate the first host message authentication code $MAC_{H1}$ in operation S404 of FIG. 4 are identical to the first data $D_1$, the device write count $K_D$, the first nonce $N_1$, and the device key $KEY_D$ used by the storage device 42 to generate the first host message verification code $MVC_{H1}$ in operation S407_3, respectively, the first host message verification code $MVC_{H1}$ may be identical to the first host message authentication code $MAC_{H1}$. Referring to FIG. 5, when the first host message verification code $MVC_{H1}$ is identical to the first host message authentication code $MAC_{H1}$, a success of verification of the first request $REQ_1$ may be determined, and operations S407_5 and S407_6 may be performed subsequently. On the other hand, when the first host message verification code $MVC_{H1}$ is different from the first host message authentication code $MAC_{H1}$, a failure of verification of the first request $REQ_1$ may be determined, and operations S407_7 and S407_8 may be performed subsequently.

When a success of verification of the first request $REQ_1$ is determined, a result in operation S407_5 may be set to be a value corresponding to the success. As described with reference to FIG. 4, the result set in operation S407_5 may be included in the first response $RES_1$, which is provided by the storage device 42 to the host 41 in response to the first request $REQ_1$ (or a separate result read request). Next, in operation S407_6, the nonce list NL may be updated. For example, when verification of the first request $REQ_1$ has succeeded as shown in FIG. 5, the storage device 42 may delete nonces included in the nonce list NL, namely, nonces respectively included in requests of which verifications have failed and been collected.

When a failure of verification of the first request $REQ_1$ is determined, a result in operation S407_7 may be set to be a value corresponding to the failure. As described with reference to FIG. 4, the result set in operation S407_7 may be included in the first response $RES_1$, which is provided by the storage device 42 to the host 41 in response to the first request $REQ_1$ (or a separate result read request). Next, in operation S407_8, the nonce list NL may be updated. For example, when verification of the first request $REQ_1$ has failed as shown in FIG. 5, the first nonce $N_1$ may be added to the nonce list NL.

Figure 6:
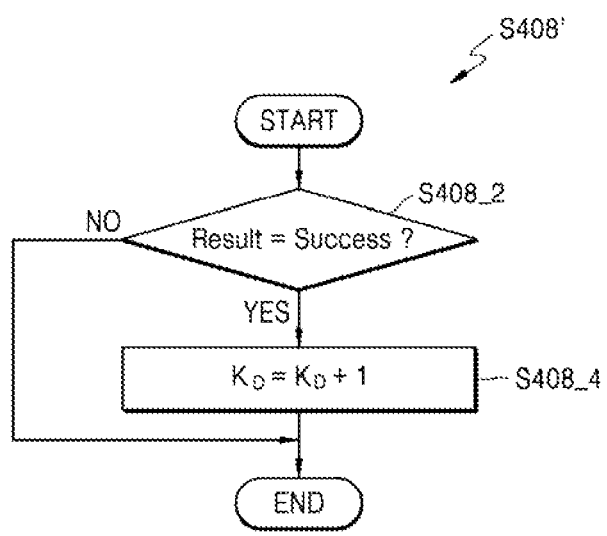
FIG. 6 is a flowchart of a method of writing data to a protected region, according to an example embodiment.

FIG. 6 is a flowchart of a method of writing data to a protected region, according to an example embodiment. In detail, the flowchart of FIG. 6 illustrates operation S408' as an example of operation S408 of FIG. 4, in which the storage device 42 updates the device write count $K_D$ based on a result of the verification of the first request $REQ_1$. Referring to FIG. 6, operation S408' may include operation S408_2 and operation S408_4. In an example embodiment, operation S408' of FIG. 6 may be performed by the storage device 42 of FIG. 4. FIG. 6 will now be described with additional reference to FIG. 4.

Referring to FIG. 6, in operation S408_2, a value that is set based on the result may be identified. As described with reference to FIG. 5, when the verification of the first request $REQ_1$ has succeeded, the storage device 42 may set the result as a value corresponding to a success, and, when the verification of the first request $REQ_1$ has failed, the storage device 42 may set the result as a value corresponding to a failure. Referring to FIG. 6, when the verification of the first request $REQ_1$ has failed, operation S408' may be concluded, and thus the device write count $K_D$ may be maintained.

When the verification of the first request $REQ_1$ has succeeded, the device write count $K_D$ may be increased in operation S408_4. For example, referring to FIG. 6, the storage device 42 may increase the device write count $K_D$ by 1, and may store the device write count $K_D$ in a register (for example, the register 122 of FIG. 1). Similarly, as described with reference to FIG. 8, when the verification of the first request $REQ_1$ succeeds, the host 41 may also increase the host write count $K_H$ by 1, and thus subsequent write requests may be processed validly.

Figure 7:
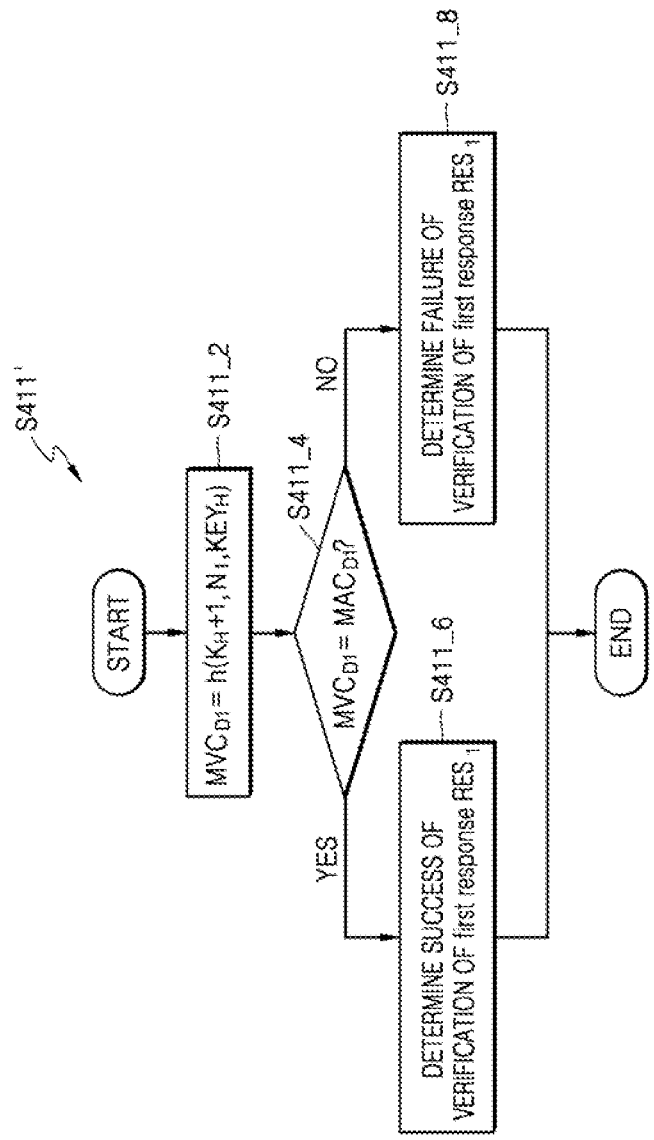
FIG. 7 is a flowchart of a method of writing data to a protected region, according to an example embodiment.

FIG. 7 is a flowchart of a method of writing data to a protected region, according to an example embodiment. In detail, the flowchart of FIG. 7 illustrates operation S411' as an example of operation S411 of FIG. 4, in which the host 41 verifies the first response $RES_1$. Referring to FIG. 7, operation S411' may include a plurality of operations S411_2, S411_4, S411_6, and S411_8. In an example embodiment, operation S411' of FIG. 7 may be performed by the host 41 of FIG. 4. FIG. 7 will now be described with additional reference to FIG. 4.

Referring to FIG. 7, in operation S411_2, a first device message verification code $MVC_{D1}$ may be generated. For example, the host 41 may generate the first device message verification code $MVC_{D1}$ from an increased host write count $K_H+1$, the first nonce $N_1$, and the host key $KEY_H$, based on the hash function h. As described with reference to FIGS. 4 and 6, when a write of the first data $D_1$ has been normally completed by the first request $REQ_1$ in the storage device 42, the first device message authentication code $MAC_{D1}$ included in the first response $RES_1$ may be generated based on the device write count $K_D$ increased by 1. Thus, the host 41 may use not only the host key $KEY_H$ and the first nonce $N_1$ saved in operation S406 of FIG. 4, but also the host write count $K_H$ increased by 1, in order to verify the first response $RES_1$.

In operation S411_4, the first device message verification code $MVC_{D1}$ and the first device message authentication code $MAC_{D1}$ may be compared with each other. When the device write count $K_D$, the first nonce $N_1$, and the device key $KEY_D$ used by the storage device 42 to generate the first device message authentication code $MAC_{D1}$ in operation S409 of FIG. 4 are identical to the increased host write count $K_H+1$, the first nonce $N_1$, and the host key $KEY_H$ used by the host 41 to generate the first device message verification code $MVC_{D1}$ in operation S411_2, the first device message verification code $MVC_{D1}$ and the first device message authentication code $MAC_{D1}$ may be identical to each other. Referring to FIG. 7, when the first device message verification code $MVC_{D1}$ is identical to the first device message authentication code $MAC_{D1}$, a success of the verification of the first response $RES_1$ may be determined, in operation S411_6. On the other hand, when the first device message verification code $MVC_Dm$ is different from the first device message authentication code $MAC_{D1}$, a failure of the verification of the first response $RES_1$ may be determined, in operation S411_8.

Figure 8:
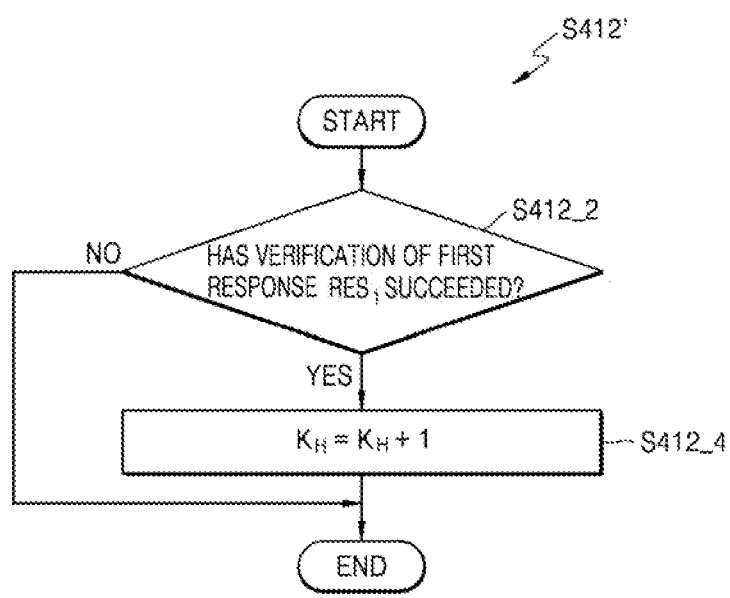
FIG. 8 is a flowchart of a method of writing data to a protected region, according to an example embodiment.

FIG. 8 is a flowchart of a method of writing data to a protected region, according to an example embodiment. In detail, the flowchart of FIG. 8 illustrates operation S412' as an example of operation S412 of FIG. 4, in which the host 41 updates the host write count $K_H$ based on a result of the verification of the first response $RES_1$. Referring to FIG. 8, operation S412' may include operation S412_2 and operation S412_4. In an example embodiment, operation S412' of FIG. 8 may be performed by the host 41 of FIG. 4. FIG. 8 will now be described with additional reference to FIG. 4.

Referring to FIG. 8, in operation S412_2, a result of the verification of the first response $RES_1$ may be identified. As described with reference to FIG. 7, when the first device message verification code $MVC_{D1}$ is identical to the first device message authentication code $MAC_{D1}$, the host 41 may determine a success of the verification of the first response $RES_1$, and, when the first device message verification code $MVC_{D1}$ is different from the first device message authentication code $MAC_{D1}$, the host 41 may determine a failure of the verification of the first response $RES_1$. Referring to FIG. 8, when the verification of the first response $RES_1$ has failed, operation S412' may be concluded, and thus the host write count $K_H$ may be maintained. When the verification of the first response $RES_1$ has succeeded, the host write count $K_H$ may be increased in operation S412_4. For example, referring to FIG. 8, the host 41 may increase the host write count $K_H$ by 1, and may generate a subsequent write request based on the increased host write count $K_H$.

FIG. 9 is a message diagram of a method of writing data to a protected region, according to an example embodiment. In the illustration of FIG. 9, compared with the illustration of FIG. 4, a storage device 92 may provide a response including a nonce to a host 91. In FIG. 9, it is assumed that the host 91 is an authenticated entity accessible to a protected region of the storage device 92. Redundant descriptions given above with reference to FIG. 4 will be omitted.

Referring to FIG. 9, the host 91 may provide the write count read request $REQ_{WC}$ to the storage device 92 in operation S901, and the storage device 92 may provide the write count read response $RES_{WC}$ to the host 91 in operation S902. For example, a message type field from among the plurality of fields included in the write count read request $REQ_{WC}$ may have a value (for example, 0002 h) corresponding to a write count read request, and a message type field from among the plurality of fields included in the write count read response $RES_{WC}$ may have a value (for example, 0200 h) corresponding to a write count read response. Referring to FIG. 9, the write count read response $RES_{WC}$ may include the device write count $K_D$.

In operation S903, the host 91 may generate the first nonce $N_1$. In operation S904, the host 91 may generate the first host message authentication code $MAC_{H1}$. For example, referring to FIG. 9, the host 91 may generate the first host message authentication code $MAC_{H1}$ based on the first data $D_1$, the host write count $K_H$, the first nonce $N_1$, and the host key $KEY_H$, based on a hash function h.

In operation S905, the host 91 may provide the first request $REQ_1$ to the storage device 92. For example, a message type field among the plurality of fields included in the first request $REQ_1$ may have a value (e.g., 0003 h) corresponding to an authenticated data write request. Referring to FIG. 9, the first request $REQ_1$ may include the first host message authentication code $MAC_{H1}$, and may include the first data $D_1$, the host write count $K_H$, and the first nonce $N_1$ used to generate the first host message authentication code $MAC_{H1}$. In operation S906, the host 91 may save the first nonce $N_1$. The first nonce $N_1$ saved in operation S906 may be used to verify a response provided by the storage device 92 in response to the first request $REQ_1$, namely, the first response $RES_1$ of operation S909.

In operation S907, the storage device 92 may increase the device write count $K_D$ by 1. For example, the storage device 92 may verify the first request $REQ_1$ provided by an authenticated host 91, and may increase the device write count $K_D$ by 1 in response to a success of the verification of the first request $REQ_1$. In operation S908, the storage device 92 may generate the first device message authentication code $MAC_{D1}$. Referring to FIG. 9, the storage device 92 may generate the first device message authentication code $MAC_{D1}$ based on the device write count $K_D$, the first nonce $N_1$, and the device key $KEY_D$, based on a hash function h. In this case, the device write count $K_D$ may have a value increased in operation S907.

In operation S909, the storage device 92 may provide a first response $RES_1$ to the host 91. For example, a message type field among a plurality of fields included in the first response $RES_1$ may have a value (e.g., 0300 h) corresponding to an authenticated data write response. When compared with the first response $RES_1$ of FIG. 4, the first response $RES_1$ may further include the first nonce $N_1$. For example, the storage device 92 may generate not only the first device message authentication code $MAC_{D1}$ and a result, but also the first response $RES_1$ including the first nonce $N_1$. Thus, the host 91 may verify the first response $RES_1$ based on not only the first device message authentication code $MAC_{D1}$, but also the first nonce $N_1$ included in the first response $RES_1$. Thus, similar to the description given with reference to FIG. 5, the host 91 may compare the first nonce $N_1$ stored in operation S906 with the first nonce $N_1$ included in the first response $RES_1$ received in operation S909, and, when the two first nonces are different from each other in contrast with the illustration of FIG. 9, the host 91 may determine a failure of the verification of the first response $RES_1$, regardless of a result of the verification of the first device message authentication code $MAC_{D1}$.

In operation S910, the host 91 may increase the host write count $K_H$ by 1. For example, the host 91 may verify the first response $RES_1$ provided by the storage device 92, and may increase the host write count $K_H$ by 1 in response to a success of the verification of the first response $RES_1$. Thus, the host write count $K_H$ updated in operation S910 may be identical to the device write count $K_D$ updated in operation S907. As described with reference to FIG. 7, the host 91 may verify the first device message authentication code $MAC_{D1}$ based on the increased host write count $K_H+1$, before updating the host write count $K_H$.

In operation S911, the host 91 may generate a second nonce $N_2$. The second nonce $N_2$ for the second request $REQ_2$ and the second response $RES_2$ (described below) may be different from the above-described first nonce $N_1$ for the first request $REQ_1$ and the first response $RES_1$. The second nonce $N_2$ may not be able to be predicted by the host 91 or an agent outside the host 91. Thus, each write request issued by the host 91 may have a unique value, i.e., a nonce, and one unique value may be used in an authenticated pair of a write request and a write response.

In operation S912, the host 91 may generate a second host message authentication code $MAC_{H2}$. For example, referring to FIG. 9, the host 91 may generate the second host message authentication code $MAC_{H2}$ based on second data $D_2$, the host write count $K_H$, the second nonce $N_2$, and the host key $KEY_H$, based on a hash function h. In this case, the host write count $K_H$ may have a value increased in operation S910.

In operation S913, the host 91 may provide a second request $REQ_2$ to the storage device 92. For example, a message type field among a plurality of fields included in the second request $REQ_2$ may have a value (e.g., 0003 h) corresponding to an authenticated data write request. Referring to FIG. 9, the second request $REQ_2$ may include the second host message authentication code $MAC_{H2}$, and may include the second data $D_2$, the host write count $K_H$, and the second nonce $N_2$ used to generate the second host message authentication code $MAC_{H2}$. In operation S914, the host 914 may save the second nonce $N_2$, and may use the second nonce $N_2$ to verify a subsequent response, i.e., the second response $RES_2$.

In operation S914, the storage device 92 may increase the device write count $K_D$ by 1. For example, the storage device 92 may verify the second request $REQ_2$ provided by an authenticated host 91, and may increase the device write count $K_D$ by 1 in response to a success of the verification of the second request $REQ_2$. In operation S916, the storage device 92 may generate a second device message authentication code $MAC_{D2}$. Referring to FIG. 9, the storage device 92 may generate the second device message authentication code $MAC_{D2}$ based on the device write count $K_D$, the first nonce $N_2$, and the device key $KEY_D$, based on a hash function h. In this case, the device write count $K_D$ may have a value increased in operation S915.

In operation S917, the storage device 92 may provide a second response $RES_2$ to the host 91. For example, a message type field among a plurality of fields included in the second response $RES_2$ may have a value (e.g., 0300 h) corresponding to an authenticated data write response. Similar to the first response $RES_1$, the second response $RES_2$ may include the second nonce $N_2$, and thus the host 91 may verify the second response $RES_2$ based on not only the second device message authentication code $MAC_{D2}$, but also the second nonce $N_2$ included in the second response $RES_2$. Thus, differently from FIG. 9, when the second nonce $N_2$ included in the second response $RES_2$ is different from the second nonce $N_2$ saved in operation S914 due to an attacker, the host 91 may determine a failure of the verification of the second response $RES_2$.

In operation S918, the host 91 may increase the host write count $K_H$ by 1. For example, the host 91 may verify the second response $RES_2$ provided by the storage device 92, and may increase the host write count $K_H$ by 1 in response to a success of the verification of the second response $RES_2$. Thus, the host write count $K_H$ updated in operation S918 may be identical to the device write count $K_D$ updated in operation S915. As described with reference to FIG. 7, the host 91 may verify the second device message authentication code $MAC_{D2}$ based on the increased host write count $K_H+1$, before updating the host write count $K_H$.

Figure 10B:
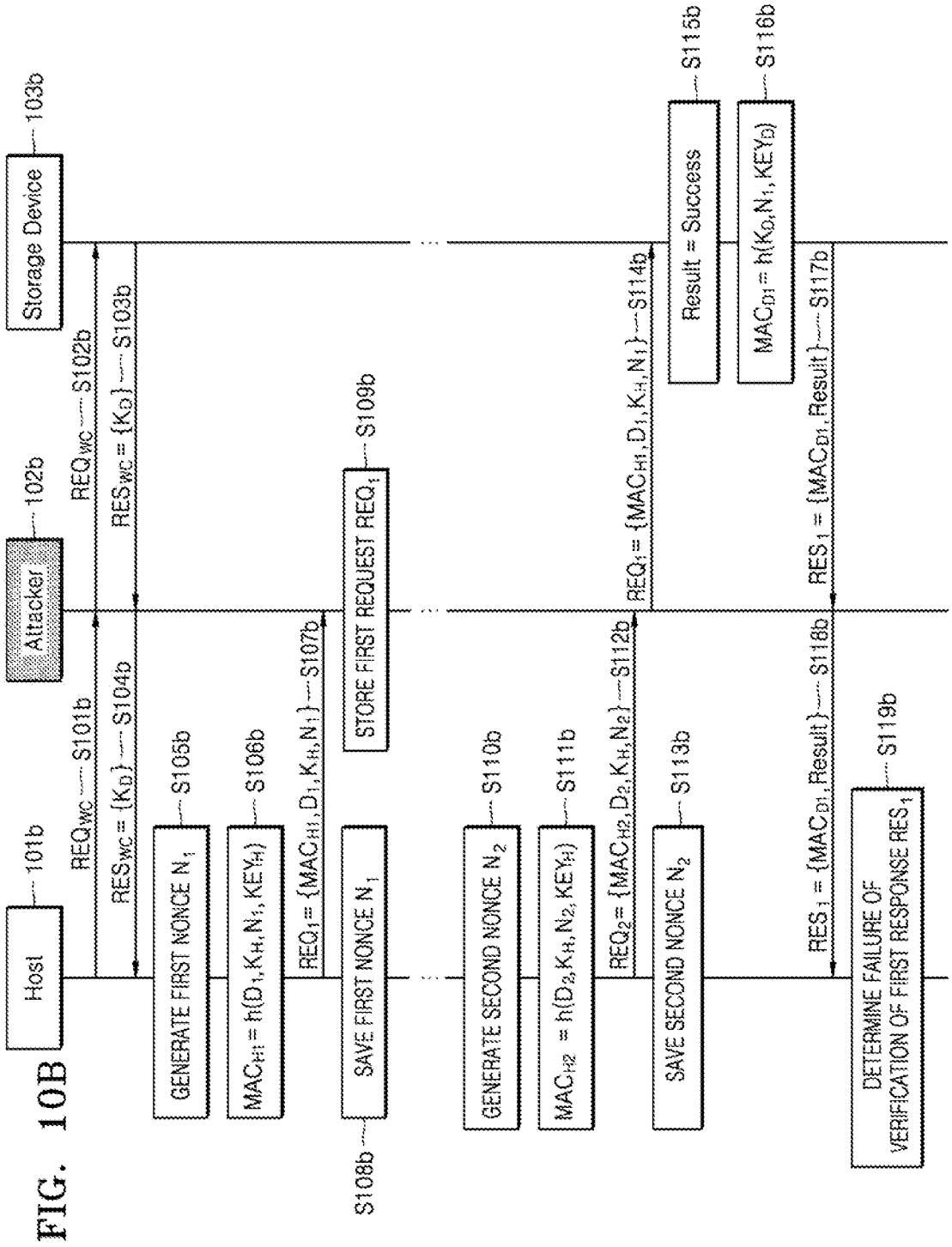

FIGS. 10A and 10B are message diagrams of methods of writing data to a protected region, according to example embodiments. In detail, the message diagrams of FIGS. 10A and 10B illustrate operations of detecting MITM attacks described above with reference to FIGS. 3A and 3B. Redundant descriptions given above with the drawings will be omitted.

Referring to FIG. 10A, in operation S101a, a host 101b may issue the write count read request $REQ_{WC}$ and an attacker 102a may receive the write count read request $REQ_{WC}$. For example, a message type field among a plurality of fields included in the write count read request $REQ_{WC}$ may have a value (e.g., 0002 h) corresponding to a write count read request. In operation S102a, the attacker 102a may transmit the write count read request $REQ_{WC}$ to a storage device 103a without changes, and the storage device 103a may receive the write count read request $REQ_{WC}$.

In operation S103a, the storage device 103a may issue the write count read response $RES_{WC}$, and the attacker 102a may receive the write count read response $RES_{WC}$. For example, a message type field among a plurality of fields included in the write count read response $RES_{WC}$ may have a value (e.g., 0002 h) corresponding to a write count read response. In operation S104a, the attacker 102a may transmit the write count read response $RES_{WC}$ to the host 101a without changes, and the host 101a may receive the write count read response $RES_{WC}$. Referring to FIG. 10A, the write count read response $RES_{WC}$ may include the device write count $K_D$.

In operation S105a, the host 101a may generate the first nonce $N_1$. In operation S106a, the host 101a may generate the first host message authentication code $MAC_{H1}$ based on the first data $D_1$, the host write count $K_H$, the first nonce $N_1$, and the host key $KEY_H$, for the first request $REQ_1$, based on a hash function h. In operation S107a, to write the first data $D_1$, the host 101a may issue the first request $REQ_1$ including the first host message authentication code $MAC_{H1}$, the first data $D_1$, the host write count $K_H$, and the first nonce $N_1$. For example, a message type field among the plurality of fields included in the first request $REQ_1$ may have a value (e.g., 0003 h) corresponding to an authenticated data write request.

In operation S108a, the attacker 102a may store the first request $REQ_1$. As described with reference to FIG. 3A, the attacker 102a may store the first request $REQ_1$ received from the authenticated host 101a in operation S107a, in order to provide the first request $REQ_1$ to the storage device 103a later. Next, in operation S109a, the attacker 102a may provide a changed first request $REQ_1'$ to the storage device 103a. For example, a message type field among the plurality of fields included in the changed first request $REQ_1'$ may have a value (e.g., 0003 h) corresponding to an authenticated data write request. To obtain a response indicating a failure of verification of a write request, the attacker 102a may generate the changed first request $REQ_1'$ by changing the first request $REQ_1$. For example, referring to FIG. 10A, the attacker 102a may generate first data D1' by changing the first data $D_1$, and may generate a changed first host message authentication code $MAC_{H1}'$ based on the changed first data D1'. Thus, referring to FIG. 10A, the changed first request $REQ_1'$ may include the changed first host message authentication code $MAC_{H1}'$, the changed first data D1', the host write count $K_H$, and the first nonce $N_1$.

In operation S110a, the storage device 103a may determine a failure of verification of the changed first request $REQ_1'$. For example, the storage device 103a may identify the host write count $K_H$ identical to the device write count $K_D$, but may identify that a host message verification code generated based on the changed first data $D1'$, the device write count $K_D$, the first nonce $N_1$, and the device key $KEY_D$ is different from the changed first host message authentication code $MAC_{H1}'$. Thus, referring to FIG. 10A, the storage device 103a may set a result as a value corresponding to a failure.

In operation S111a, the storage device 103a may generate the first device message authentication code $MAC_{D1}$. For example, referring to FIG. 10A, the storage device 103a may generate the first device message authentication code $MAC_{D1}$ based on the device write count $K_D$, the first nonce $N_1$, and the device key $KEY_D$, based on a hash function h. Due to a failure of verification of the changed first request $REQ_1'$, the device write count $K_D$ used to generate the first device message authentication code $MAC_{D1}$ may be maintained, and may have a value provided to the host 101a in operation S103a.

In operation S112a, the storage device 103a may issue the first response $RES_1$, and the attacker 102a may receive the first response $RES_1$. For example, a message type field among a plurality of fields included in the first response $RES_1$ may have a value (e.g., 0300 h) corresponding to an authenticated data write response. Referring to FIG. 10A, the first response $RES_1$ may include the first device message authentication code $MAC_{D1}$ and the result. As set in operation S110a, the result may have a value corresponding to the failure.

In operation S113a, the attacker 102a may store the first response $RES_1$. As described with reference to FIG. 3A, the attacker 102a may store the first request $REQ_1$ received from the storage device 103a in operation S112a, in order to provide the first response $RES_1$ to the host 101a later. Next, in operation S114a, the attacker 102a may provide the first request $REQ_1$ to the storage device 103a. Thus, the attacker 102a may obtain the first response $RES_1$ from the storage device 103a and then may provide the first request $REQ_1$ stored in operation S108a to the storage device 103a.

In operation S115a, the storage device 130a may determine a failure of verification of the first request $REQ_1$. Although the first request $REQ_1$ is identical to that issued by the authenticated host 101a in operation S107a, the storage device 103a may identify that the first nonce $N_1$ included in the first request $REQ_1$ is identical to the first nonce $N_1$ used to verify the changed first request $REQ_1'$ in operation S110a. Thus, the storage device 103a may determine a failure of the verification of the first request $REQ_1$ as described above with reference to FIG. 5, and may set a result as a value corresponding to the failure as shown in FIG. 10A. Thus, differently from FIG. 3A, writing of the first data $D_1$ to the storage device 103a may fail.

In operation S116a, the storage device 103a may generate a second device message authentication code $MAC_{D2}$. For example, referring to FIG. 10A, the storage device 103a may generate the first device message authentication code $MAC_{D1}$ based on the device write count $K_D$, the first nonce $N_1$, and the device key $KEY_D$, based on a hash function h. Due to a failure of verification of the first request $REQ_1$, the device write count $K_D$ used to generate the second device message authentication code $MAC_{D2}$ may be maintained, and may have a value provided to the host 101a in operation S103a.

In operation S117a, the storage device 103a may issue the second response $RES_2$, and the attacker 102a may receive the second response $RES_2$. For example, a message type field among a plurality of fields included in the second response $RES_2$ may have a value (e.g., 0300 h) corresponding to an authenticated data write response. Referring to FIG. 10A, the second response $RES_2$ may include the second device message authentication code $MAC_{D2}$ and the result, and, as set in operation S115a, the result may have a value corresponding to the failure. Thus, the attacker 102a may identify a failure of writing of the first data $D_1$, differently from FIG. 3A.

In view of the above, in spite of the failure of writing of the first data $D_1$, the attacker 102a may provide the host 101a with the first response $RES_1$ received from the storage device 103a in operation S112a, as in FIG. 3A. In this case, the host 101a may generate a host message verification code to verify the first response $RES_1$, and the host message verification code may be identical to the first device message authentication code $MAC_{D1}$ included in the first response $RES_1$. Thus, the host 101a may determine a success of verification of the first response $RES_1$, and may rely on a write failure indicated by the result included in the first response $RES_1$. Even when the attacker 102a provides the host 101a with the second response $RES_2$ received from the storage device 103a in operation S117a, the host 101a may determine a success of the verification of the second response $RES_2$, and may rely on a write failure indicated by the result included in the second response $RES_2$. Thus, the host 101a may identify a first state where the first data $D_1$ has not been written to the storage device 103a, and the attacker 102a may fail to make a state different from the first state, namely, a second state where the first data $D_1$ has been successfully written to the storage device 103a.

Referring to FIG. 10B, in operation S101b, a host 101b may issue the write count read request $REQ_{WC}$ and an attacker 102b may receive the write count read request $REQ_{WC}$. For example, a message type field among a plurality of fields included in the write count read request $REQ_{WC}$ may have a value (e.g., 0002 h) corresponding to a write count read request. In operation S102b, the attacker 102b may transmit the write count read request $REQ_{WC}$ to a storage device 103b without changes, and the storage device 103b may receive the write count read request $REQ_{WC}$.

In operation S103b, the storage device 103a may issue the write count read response $RES_{WC}$, and the attacker 102b may receive the write count read response $RES_{WC}$. For example, a message type field among a plurality of fields included in the write count read response $RES_{WC}$ may have a value (e.g., 0002 h) corresponding to a write count read response. In operation S104b, the attacker 102b may transmit the write count read response $RES_{WC}$ to the host 101b without changes, and the host 101b may receive the write count read response $RES_{WC}$. Referring to FIG. 10B, the write count read response $RES_{WC}$ may include the device write count $K_D$.

In operation S105b, the host 101b may generate the first nonce $N_1$. In operation S106b, the host 101b may generate the first host message authentication code $MAC_{H1}$ based on the first data $D_1$, the host write count $K_H$, the first nonce $N_1$, and the host key $KEY_H$, for the first request $REQ_1$, based on a hash function h. In operation S107b, to write the first data $D_1$, the host 101b may issue the first request $REQ_1$ including the first host message authentication code $MAC_{H1}$, the first data $D_1$, the host write count $K_H$, and the first nonce $N_1$, and the attacker 102b may receive the first request $REQ_1$. For example, a message type field among the plurality of fields included in the first request $REQ_1$ may have a value (e.g., 0003 h) corresponding to an authenticated data write request.

In operation S108b, the host 101b may save the first nonce $N_1$ in order to verify a response corresponding to the first request $REQ_1$. In operation S109b, the attacker 102b may store the first request $REQ_1$. As described with reference to FIG. 3B, the attacker 102b may store the first request $REQ_1$ received from the authenticated host 101b in operation S107b, in order to provide the first request $REQ_1$ to the storage device 103b later.

In operation S110b, the host 101b may generate the second nonce $N_2$. The second nonce $N_2$ for the second request $REQ_2$ may be different from the first nonce $N_1$ used to generate the first request $REQ_1$. In operation S111b, the host 101b may generate the second host message authentication code $MAC_{H2}$ based on the second data $D_2$, the host write count $K_H$, the second nonce $N_2$, and the host key $KEY_H$, for the second request $REQ_2$, based on a hash function h. At this time, a response indicating a success of a write operation has not been received in response to the first request $REQ_1$, and accordingly the host write count $K_H$ may be identical to the host write count $K_H$ used to generate the first host message authentication code $MAC_{H1}$ in operation S106b. In operation S112b, to write the second data $D_2$, the host 101b may issue the second request $REQ_2$ including the second host message authentication code $MAC_{H2}$, the second data $D_2$, the host write count $K_H$, and the second nonce $N_2$, and the attacker 102b may receive the second request $REQ_2$. For example, a message type field among a plurality of fields included in the second request $REQ_2$ may have a value (e.g., 0003 h) corresponding to an authenticated data write request. In operation S113b, the host 101b may save the second nonce $N_2$.

In operation S114b, the attacker 102b may provide the first request $REQ_1$ to the storage device 103b. The attacker 102b may provide the storage device 103b with the first request $REQ_1$ stored in operation S108b, without changes. Thus, referring to FIG. 10B, the first request $REQ_1$ including the first host message authentication code $MAC_{H1}$, the first data $D_1$, the host write count $K_H$, and the first nonce $N_1$ may be provided to the storage device 103b.

In operation S115b, the storage device 130b may determine a success of verification of the first request $REQ_1$. For example, the storage device 103b may individually identify the host write count $K_H$ identical to the device write count $K_D$ and the first nonce $N_1$ different from a previous nonce No, and may generate a message verification code identical to the first host message authentication code $MAC_{H1}$. Thus, referring to FIG. 10B, the storage device 103b may set a result as a value corresponding to a success.

In operation S116b, the storage device 103b may generate the first device message authentication code $MAC_{D1}$. For example, referring to FIG. 10B, the storage device 103b may generate the first device message authentication code $MAC_{D1}$ based on the device write count $K_D$, the first nonce $N_1$, and the device key $KEY_D$, based on a hash function h. Due to a success of verification of the first request $REQ_1$, the device write count $K_D$ used to generate the first device message authentication code $MAC_{D1}$ may have a value obtained by increasing, by 1, the value provided to the host 101b in operation S103b.

In operation S117b, the storage device 103b may issue the first response $RES_1$, and the attacker 102b may receive the first response $RES_1$. For example, a message type field among a plurality of fields included in the first response $RES_1$ may have a value (e.g., 0300 h) corresponding to an authenticated data write response. Referring to FIG. 10B, the first response $RES_1$ may include the first device message authentication code $MAC_{D1}$ and the result. As set in operation S115b, the result may have a value corresponding to the success. In operation S118b, the attacker 102b may transmit the first response $RES_1$ to the host 101b, without changes.

In operation S119b, the host 101b may determine a failure of verification of the first response $RES_1$. The first device message authentication code $MAC_{D1}$ included in the first response $RES_1$ may be generated based on the first nonce $N_1$ in operation S116b, whereas the message verification code generated by the host 101b in operation S119b may be based on the second nonce $N_2$ saved in operation S113b. Thus, the first device message authentication code $MAC_{D1}$ may be different from the message verification code, and the host 101b may determine a failure of the verification of the first response $RES_1$. In an example embodiment, as described above with reference to FIG. 9, when the first response $RES_1$ includes the first nonce $N_1$, the host 101b may identify that the first nonce $N_1$ is different from the second nonce $N_2$, and accordingly may determine a failure of the verification of the first response $RES_1$. Thus, the host 101b may not rely on a write success indicated by the result included in the first result $RES_1$. Thus, the attacker 102b may fail to allow the host 101b to identify a state of the storage device 103b as a second state different from a first state where the second data D2 has not been stored in the storage device 103b, the second state where the second data D2 has been stored in the storage device 103b.

Figure 11:
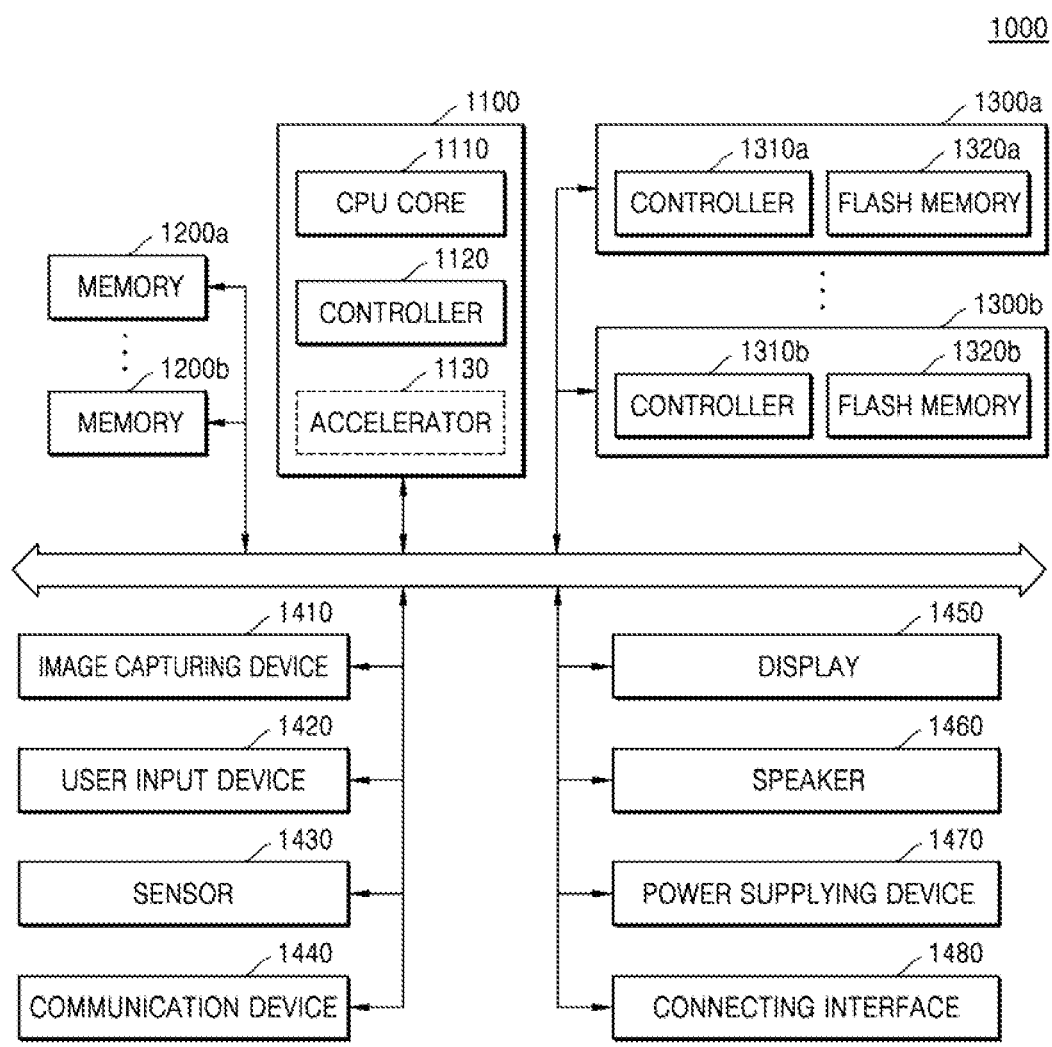
FIG. 11 is a block diagram of a system 1000 to which a storage device according to an example embodiment is applied.

FIG. 11 is a block diagram of a system 1000 to which a storage device according to an example embodiment may be applied. The system 1000 of FIG. 11 may be, e.g., a mobile system such as a portable communication terminal (a mobile phone), a smartphone, a tablet PC, a wearable device, a healthcare device, or an Internet of Things (IoT) device. However, the system 1000 of FIG. 11 is not limited to a mobile system and may be a PC, a laptop computer, a server, a media player, or an automotive device such as a navigation device. Hereinafter, a suffix attached to a reference numeral (e.g., 'a' in 1200a and 'a' in 1300a) is for discriminating a plurality of circuits configured to perform the same facility.

Referring to FIG. 11, the system 1000 may include a main processor 1100, memories 1200a and 1200b, and storage devices 1300a and 1300b, and may include one or more of an image capturing device 1410, a user input device 1420, a sensor 1430, a communication device 1440, a display 1450, a speaker 1460, a power supplying device 1470, and a connecting interface 1480.

The main processor 1100 may control a general operation of the system 1000, e.g., control operations of the other components included in the system 1000. The main processor 1100 may be implemented by a general-purpose processor, an exclusive processor, an AP, or the like.

The main processor 1100 may include one or more CPU cores 1110 and may include a controller 1120 configured to control the memories 1200a and 1200b and/or the storage devices 1300a and 1300b. The main processor 1100 may include an accelerator block 1130 that is an exclusive circuit configured to perform HS data calculation such as artificial intelligence (AI) data calculation. The accelerator block 1130 may include a graphics processing unit (GPU), a neural processing unit (NPU), a data processing unit (DPU), and/or the like, and may be implemented by a separate chip physically independent to the other components in the main processor 1100.

The memories 1200a and 1200b may be used as a main memory device of the system 1000 and may include a volatile memory such as static random access memory (SRAM) and/or DRAM or include an NVM such as flash memory, PRAM, and/or RRAM. The memories 1200a and 1200b may be implemented in the same package as the main processor 1100.

The storage devices 1300a and 1300b may function as a nonvolatile storage device storing data regardless of whether power is supplied thereto, and may have a larger storage capacity than the memories 1200a and 1200b. The storage devices 1300a and 1300b may include storage controllers 1310a and 1310b and NVM storages 1320a and 1320b storing data under control of the storage controllers 1310a and 1310b, respectively. The NVM storages 1320a and 1320b may include V-NAND flash memory of a two-dimensional (2D) or three-dimensional (3D) structure, or another type of NVM such as PRAM and/or RRAM.

The storage devices 1300a and 1300b may be included in the system 1000 physically separated from the main processor 1100, or may be implemented in the same package as the main processor 1100. The storage devices 1300a and 1300b may have a form such as a memory card form to be detachably coupled to the other components in the system 1000 through an interface such as the connecting interface 1480 described below. The storage devices 1300a and 1300b may be devices to which a standard protocol such as a UFS protocol is applied, but are not limited thereto.

The image capturing device 1410 may capture a still image or a moving picture, and may include a camera, a camcorder, a webcam, and/or the like.

The user input device 1420 may receive various types of data from a user of the system 1000, and may include a touch pad, a keypad, a keyboard, a mouse, a microphone, and/or the like.

The sensor 1430 may sense various types of physical quantities, which may be obtained from the outside, and convert the sensed physical quantity into an electrical signal. The sensor 1430 may include a temperature sensor, a pressure sensor, an illumination sensor, a position sensor, an acceleration sensor, a biosensor, a gyroscope, and/or the like.

The communication device 1440 may perform signal transmission and reception between the system 1000 and other devices outside the system 1000 according to various communication protocols. The communication device 1440 may be implemented using an antenna, a transceiver, a modem, and/or the like.

The display 1450 and the speaker 1460 may function as output devices configured to output visual information and auditory information to the user of the system 1000, respectively.

The power supplying device 1470 may convert power supplied from a battery (not shown) in the system 1000 and/or an external power source, and supply the converted power to each component in the system 1000.

The connecting interface 1480 may provide a connection between the system 1000 and an external device connected to the system 1000 to transmit and receive data to and from the system 1000. The connecting interface 1480 may be implemented by various interface schemes such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI express (PCIe) interface, an NVM express (NVMe) interface, an Institute of Electrical and Electronics Engineers (IEEE) 1394 interface, a universal serial bus (USB) interface, a secure digital (SD) card interface, a multi-media card (MMC) interface, an embedded MMC (eMMC) interface, a UFS interface, an embedded UFS (eUFS) interface, and a compact flash (CF) card interface.

Figure 12:
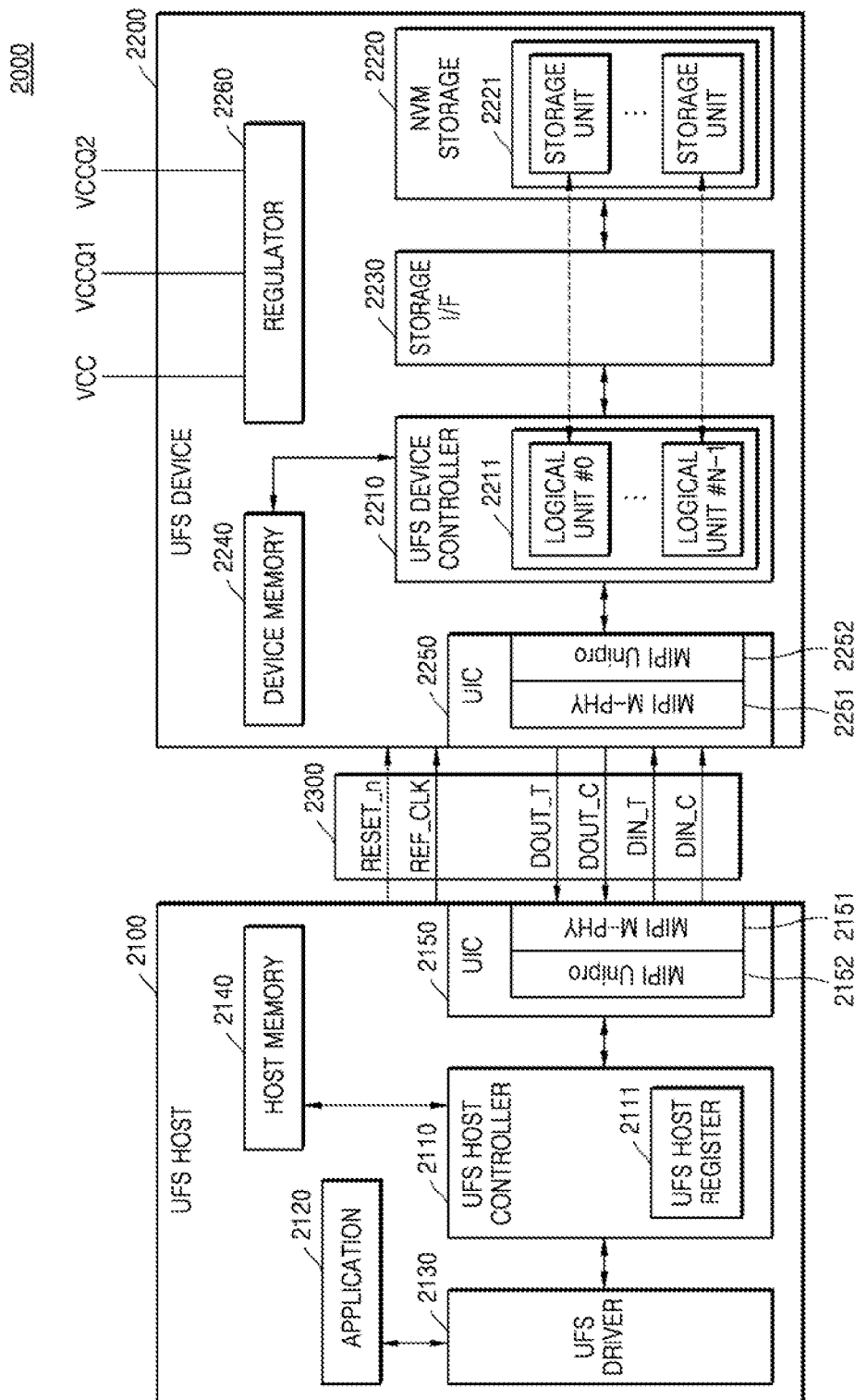
FIG. 12 is a block diagram of a UFS system 2000 according to an example embodiment.

FIG. 12 is a block diagram of a UFS system 2000 according to an example embodiment. The UFS system 2000 is a system conforming to a UFS standard issued by the Joint Electron Device Engineering Council (JEDEC) and may include a UFS host 2100, a UFS device 2200, and a UFS interface 2300. The above description of the system 1000 of FIG. 11 may also be applied to the UFS system 2000 of FIG. 12 within a range that does not conflict with a description made below with reference to FIG. 12.

Referring to FIG. 12, the UFS host 2100 and the UFS device 2200 may be connected to each other through the UFS interface 2300. When the main processor 1100 of FIG. 11 is an AP, the UFS host 2100 may be implemented as a part of the AP. A UFS host controller 2110 and a host memory 2140 may correspond to the controller 1120 in the main processor 1100 and the memories 1200a and 1200b of FIG. 11, respectively. The UFS device 2200 may correspond to the storage devices 1300a and 1300b of FIG. 11, and a UFS device controller 2210 and an NVM storage 2220 may correspond to the storage controllers 1310a and 1310b and the NVM storages 1320a and 1320b of FIG. 11, respectively.

The UFS host 2100 may include the UFS host controller 2110, an application 2120, a UFS driver 2130, the host memory 2140, and a UFS interconnect (UIC) layer 2150. The UFS device 2200 may include the UFS device controller 2210, the NVM storage 2220, a storage interface 2230, a device memory 2240, a UIC layer 2250, and a regulator 2260. The NVM storage 2220 may include a plurality of storage units 2221, and the storage unit 2221 may include a V-NAND flash memory of a 2D or 3D structure or another type of NVM such as PRAM and/or RRAM. The UFS device controller 2210 and the NVM storage 2220 may be connected to each other through the storage interface 2230. The storage interface 2230 may be implemented to conform to a standard protocol such as a toggle or open NAND flash interface (ONFI) protocol.

The application 2120 may indicate a program, which desires to communicate with the UFS device 2200 to use a facility of the UFS device 2200. The application 2120 may transmit an input-output request (IOR) to the UFS driver 2130 for an input to or an output from the UFS device 2200. The IOR may indicate a data read request, a data write request, a data discard request, and/or the like but is not limited thereto.

The UFS driver 2130 may manage the UFS host controller 2110 through a UFS-host controller interface (HCI). The UFS driver 2130 may translate an IOR generated by the application 2120 into a UFS command defined by a UFS standard, and transmit the translated UFS command to the UFS host controller 2110. One IOR may be translated into a plurality of UFS commands. A UFS command may be basically a command defined by a SCSI standard but may be a UFS standard exclusive command.

The UFS host controller 2110 may transmit the UFS command translated by the UFS driver 2130 to the UIC layer 2250 in the UFS device 2200 through the UIC layer 2150 and the UFS interface 2300. In this process, a UFS host register 2111 in the UFS host controller 2110 may act as a command queue (CQ).

The UIC layer 2150 in the UFS host 2100 may include a MIPI M-PHY 2151 and a MIPI UniPro 2152, and the UIC layer 2250 in the UFS device 2200 may also include a MIPI M-PHY 2251 and a MIPI UniPro 2252.

The UFS interface 2300 may include a line through which a reference clock signal REF_CLK is transmitted, a line through which a hardware reset signal RESET_n for the UFS device 2200 is transmitted, a pair of lines through which a differential input signal pair DIN_T and DIN_C is transmitted, and a pair of lines through which a differential output signal pair DOUT_T and DOUT_C is transmitted.

A frequency value of the reference clock signal REF_CLK provided from the UFS host 2100 to the UFS device 2200 may be one of, e.g., four values, e.g., 19.2 MHz, 26 MHz, 38.4 MHz, and 52 MHz, but is not limited thereto. The UFS host 2100 may change the frequency value of the reference clock signal REF_CLK even during an operation, i.e., even while data is being transmitted and received between the UFS host 2100 and the UFS device 2200. The UFS device 2200 may generate clock signals of various frequencies from the reference clock signal REF_CLK received from the UFS host 2100, by using a phase-locked loop (PLL) or the like. In addition, the UFS host 2100 may set a value of a data rate between the UFS host 2100 and the UFS device 2200 based on the frequency value of the reference clock signal REF_CLK. Thus, the value of the data rate may be determined depending on the frequency value of the reference clock signal REF_CLK.

The UFS interface 2300 may support multiple lanes, and each lane may be implemented by a differential pair. For example, the UFS interface 2300 may include one or more reception lanes and one or more transmission lanes. In FIG. 12, the pair of lines through which the differential input signal pair DIN_T and DIN_C is transmitted may form a reception lane, and the pair of lines through which the differential output signal pair DOUT_T and DOUT_C is transmitted may form a transmission lane. Although FIG. 12 shows one transmission lane and one reception lane, the number of transmission lanes and the number of reception lanes may vary.

The reception lane and the transmission lane may transmit data in a serial communication scheme, and full-duplex communication between the UFS host 2100 and the UFS device 2200 may be performed by a structure in which the reception lane is separated from the transmission lane. Thus, the UFS device 2200 may transmit data to the UFS host 2100 through the transmission lane even while receiving data from the UFS host 2100 through the reception lane. In addition, control data such as a command from the UFS host 2100 to the UFS device 2200 and user data to be stored in or read from the NVM storage 2220 in the UFS device 2200 may be transmitted through the same lane. Thus, a separate lane for data transmission may not be provided between the UFS host 2100 and the UFS device 2200 besides the reception lane and the transmission lane.

The UFS device controller 2210 in the UFS device 2200 may generally control an operation of the UFS device 2200. The UFS device controller 2210 may manage the NVM storage 2220 through logical units (LUs) 2211, which are logical data storage units. The number of LUs 2211 may be 8 but is not limited thereto. The UFS device controller 2210 may include a flash translation layer (FTL) and may translate a logical data address, e.g., a logical block address (LBA), transmitted from the UFS host 2100 into a physical data address, e.g., a physical block address (PBA), by using address mapping information of the FTL. A logical block for storage of user data in the UFS system 2000 may have a size of a certain range. For example, a minimum size of the logical block may be set to 4 Kbytes.

When a command from the UFS host 2100 is input to the UFS device 2200 through the UIC layer 2250, the UFS device controller 2210 may perform an operation according to the input command and transmit, when the operation is completed, a completion response to the UFS host 2100.

For example, when the UFS host 2100 desires to store user data in the UFS device 2200, the UFS host 2100 may transmit a data write command to the UFS device 2200. When a ready-to-transfer response indicating ready to receive the user data is received from the UFS device 2200, the UFS host 2100 may transmit the user data to the UFS device 2200. The UFS device controller 2210 may temporarily store the received user data in the device memory 2240, and may store the user data, temporarily stored in the device memory 2240, in a selected location of the NVM storage 2220 based on the address mapping information of the FTL.

As another example, when the UFS host 2100 desires to read user data stored in the UFS device 2200, the UFS host 2100 may transmit a data read command to the UFS device 2200. The UFS device controller 2210, which has received the data read command, may read the user data from the NVM storage 2220 based on the data read command and temporarily store the read user data in the device memory 2240. In this read process, the UFS device controller 2210 may detect an error of the read user data and correct the detected error, e.g., by using an embedded error correction code (ECC) circuit (not shown). Thereafter, the UFS device controller 2210 may transmit the user data, temporarily stored in the device memory 2240, to the UFS host 2100. In addition, the UFS device controller 2210 may further include an advanced encryption standard (AES) circuit (not shown), and the AES circuit may encrypt or decrypt data, input to the UFS device controller 2210, by using a symmetric-key algorithm.

The UFS host 2100 may sequentially store commands, to be transmitted to the UFS device 2200, in the UFS host register 2111, which may function as a CQ, and transmit the commands to the UFS device 2200 in the storage sequence. In this case, even when a previously transmitted command is being processed by the UFS device 2200, i.e., even when a notification indicating that the previously transmitted command is completely processed by the UFS device 2200 is not received, the UFS host 2100 may transmit a subsequent command buffered in the CQ to the UFS device 2200, and thus the UFS device 2200 may also receive the subsequent command from the UFS host 2100 even while processing the previously transmitted command. A maximum number (queue depth) of commands, which may be stored in the CQ, may be, e.g., 32. In addition, the CQ may be implemented in a circular queue type in which a start point and an end point of a command string stored in the CQ are respectively indicated by a head pointer and a tail pointer.

Each of the plurality of storage units 2221 may include a memory cell array and a control circuit configured to control an operation of the memory cell array. The memory cell array may include a 2D or 3D memory cell array. The memory cell array may include a plurality of memory cells, and each memory cell may be a single level cell (SLC) in which one-bit information is stored, or a cell in which two-or-more-bit information is stored, such as a multi-level cell (MLC), a triple level cell (TLC), or a quadruple level cell (QLC). The 3D memory cell array may include a V-NAND string vertically oriented so that at least one memory cell is located on another memory cell.

Power source voltages such as VCC, VCCQ1, and VCCQ2 may be input to the UFS device 2200. VCC may be a main power source voltage for the UFS device 2200 and may have a value of about 2.4 V to about 3.6 V. VCCQ1 may be a power source voltage for supplying a low-level voltage, e.g., for the UFS device controller 2210, and may have a value of about 1.14 V to about 1.26 V. VCCQ2 may be a power source voltage for supplying a voltage of a level lower than VCC but higher than VCCQ1, e.g., for an input-output interface such as the MIPI M-PHY 2251, and may have a value of about 1.7 V to about 1.95 V. The power source voltages may be supplied to each component in the UFS device 2200 through the regulator 2260. The regulator 2260 may be implemented by a set of unit regulators respectively connected to the power source voltages described above.

Figure 13A:
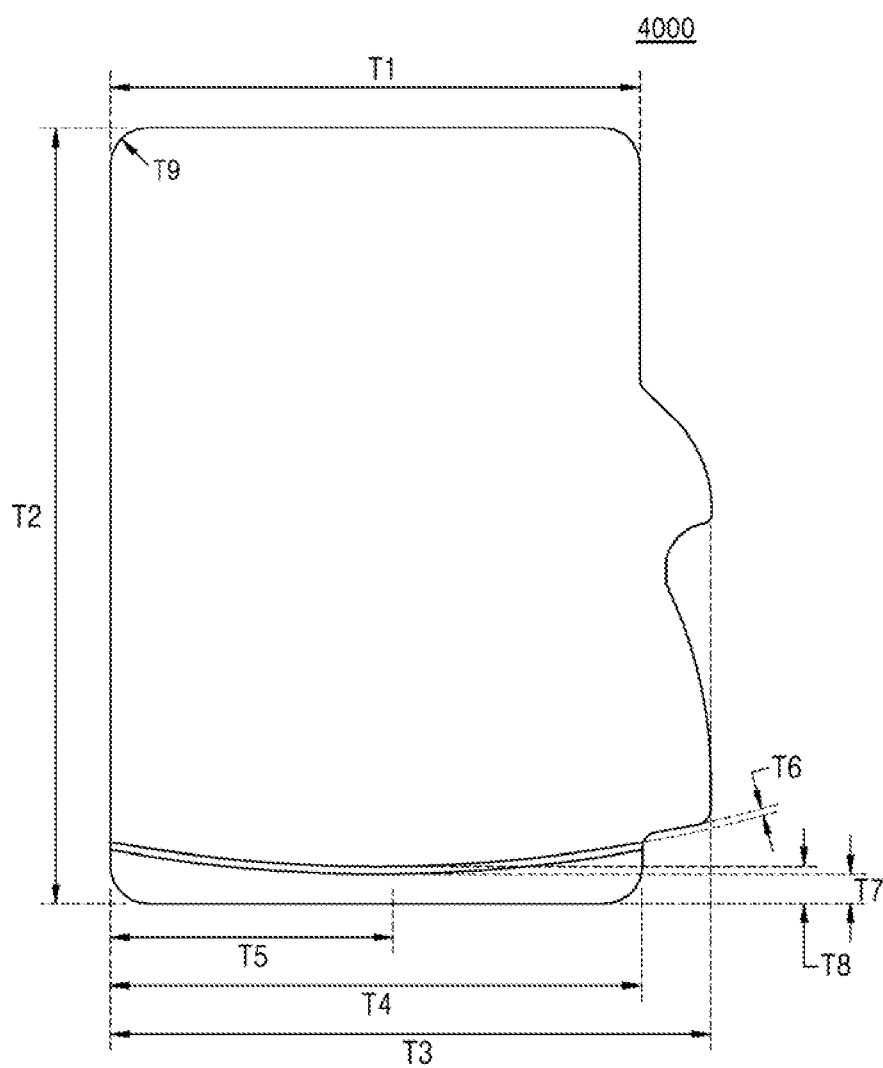
FIGS. 13A to 13C are diagrams for describing a form factor of a UFS card.
Figure 13B:
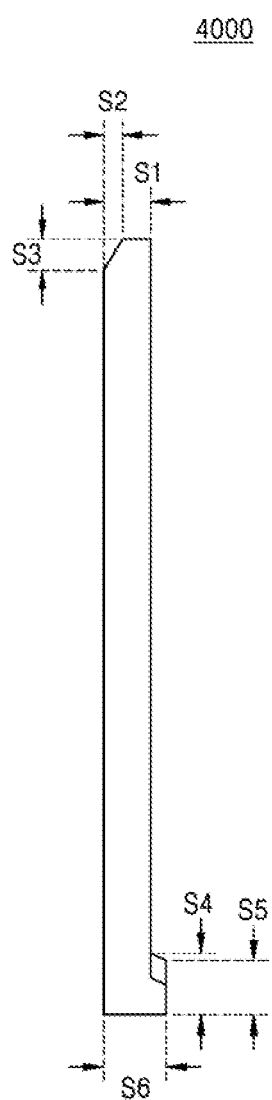
Figure 13C:
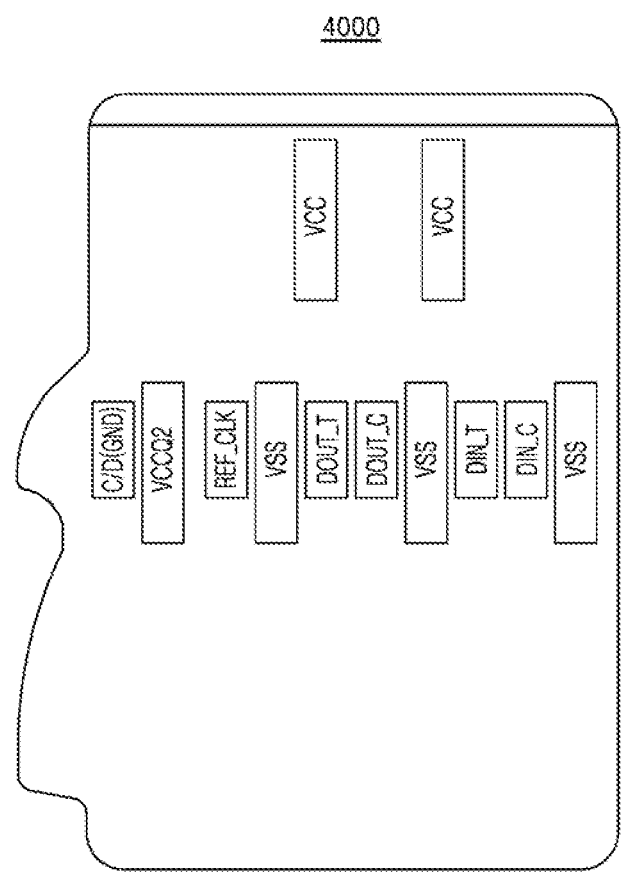

FIGS. 13A to 13C are diagrams for describing a form factor of a UFS card. When the UFS device 2200 described with reference to FIG. 12 is implemented in a form of a UFS card 4000, the exterior appearance of the UFS card 4000 may be as shown in FIGS. 13A to 13C.

FIG. 13A is a top view of the UFS card 4000. Referring to FIG. 13A, the UFS card 4000 may have a shape or design like a shark fin. In FIG. 13A, the UFS card 4000 may have, e.g., dimensions shown in Table 1 below.

FIG. 13C is a bottom view of the UFS card 4000. Referring to FIG. 13C, a plurality of pins for an electrical contact with a UFS slot may be formed on a bottom surface of the UFS card 4000, and a function of each pin will be described below. By symmetry between a top surface and the bottom surface of the UFS card 4000, some (e.g., T1 to T5 and T9) of the information about the dimensions described with reference to FIG. 13A and Table 1 may also be applied to the bottom view of the UFS card 4000 as shown in FIG. 13C.

The plurality of pins for an electrical connection with a UFS host may be formed on the bottom surface of the UFS card 4000, and according to FIG. 13C, a total number of pins may be 12. Each pin may have a rectangular shape, and a signal name corresponding to each pin may be as shown in FIG. 13C. Brief information of each pin may refer to Table 3 below and may also refer to the description made above with reference to FIG. 12.

TABLE 2

| Item | Dimension (mm) |
|------|----------------|
| S1 | 0.74 ± 0.06 |
| S2 | 0.30 |
| S3 | 0.52 |
| S4 | 1.20 |
| S5 | 1.05 |
| S6 | 1.00 |

TABLE 3

| Number | Signal name | Description | Dimension (mm) |
|--------|-------------|-------------|----------------|
| 1 | VSS | Ground (GND) | 3.00 × 0.72 ± 0.05 |
| 2 | DIN_C | Differential input signal input from a host to | 1.50 × 0.72 ± 0.05 |
| 3 | DIN_T | the UFS card 4000 (DIN_C denotes a negative node, and DIN_T denotes a positive node) | |
| 4 | VSS | Same as number 1 | 3.00 × 0.72 ± 0.05 |
| 5 | DOUT_C | Differential output signal output from the UFS | 1.50 × 0.72 ± 0.05 |
| 6 | DOUT_T | card 4000 to a host (DOUT_C denotes a negative node, and DOUT_T denotes a positive node) | |
| 7 | VSS | Same as number 1 | 3.00 × 0.72 ± 0.05 |
| 8 | REF_CLK | Reference clock provided from a host to the UFS card 4000 | 1.50 × 0.72 ± 0.05 |
| 9 | VCCQ2 | Power source voltage having a relatively lower value than VCC, which is mainly provided for a PHY interface or a controller | 3.00 × 0.72 ± 0.05 |
| 10 | C/D(GND) | Signal for card detection | 1.50 × 0.72 ± 0.05 |
| 11 | VSS | Same as number 1 | 3.00 × 0.80 ± 0.05 |
| 12 | Vcc | Main power source voltage | |

TABLE 1

| Item | Dimension (mm) |
|------|----------------|
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | 0.80 (R) |

FIG. 13B is a side view of the UFS card 4000. In FIG. 13B, the UFS card 4000 may have, e.g., dimensions shown in Table 2 below.

Figure 14:
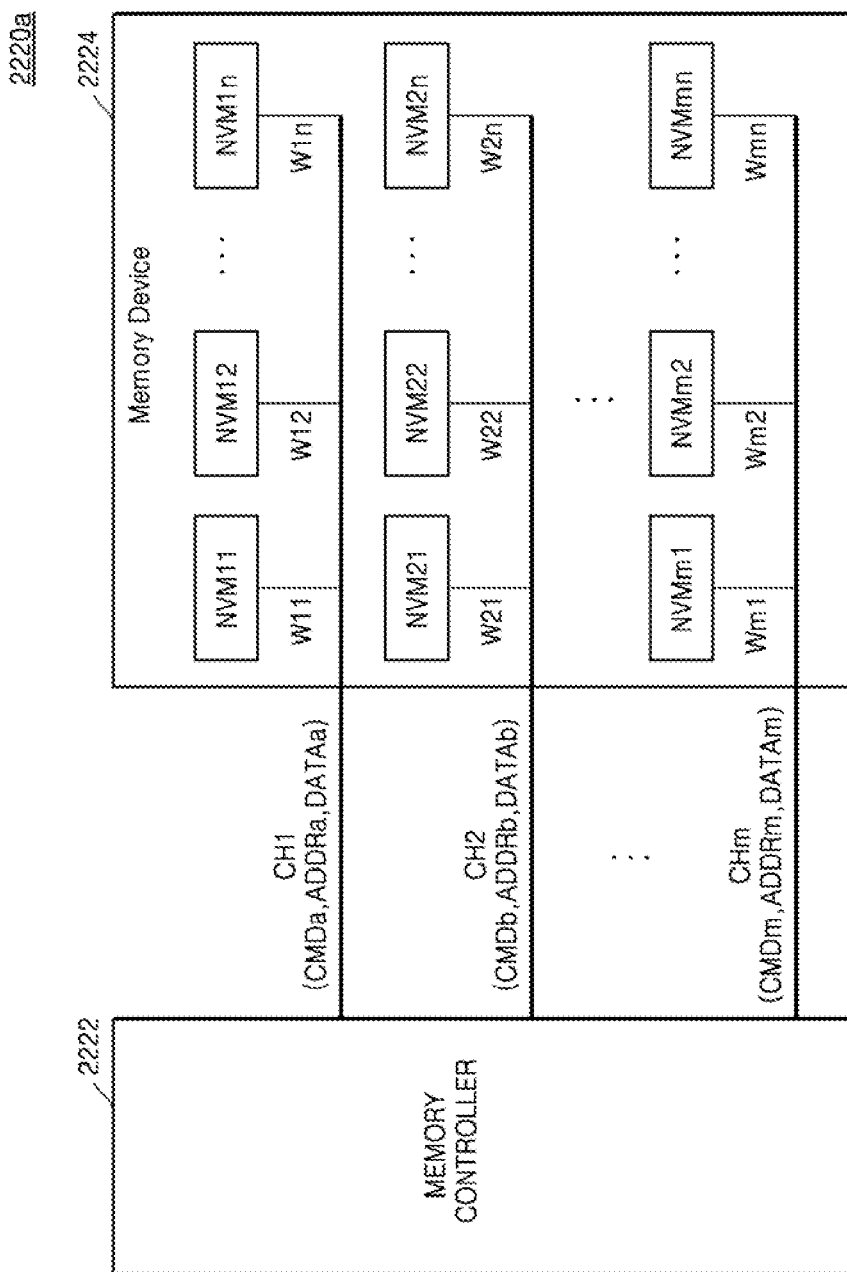
FIG. 14 is a block diagram of a NVM storage 2220$a$ according to an example embodiment.

FIG. 14 is a block diagram of a NVM storage 2220a according to an example embodiment.

Referring to FIG. 14, the NVM storage 2220a may include a memory device 2224 and a memory controller 2222. The NVM storage 2220a may support a plurality of channels, e.g., first to mth channels CH1 to CHm, and the memory device 2224 and the memory controller 2222 may be connected to each other through the first to mth channels CH1 to CHm. For example, the NVM storage 2220a may be implemented by a storage device such as an SSD.

The memory device 2224 may include a plurality of NVM devices NVM11 to NVMmn. Each of the plurality of NVM devices NVM11 to NVMmn may be connected to one of the first to mth channels CH1 to CHm through a corresponding way. For example, the NVM devices NVM11 to NVM1n may be connected to the first channel CH1 through ways W11 to W1n, respectively, and the NVM devices NVM21 to NVM2n may be connected to the second channel CH2 through ways W21 to W2n, respectively. In an example embodiment, each of the plurality of NVM devices NVM11 to NVMmn may be implemented in random memory units operable according to an individual command from the memory controller 2222. For example, each of the plurality of NVM devices NVM11 to NVMmn may be implemented by a chip or a die, but embodiments are not limited thereto.

The memory controller 2222 may transmit and receive signals to and from the memory device 2224 through the first to mth channels CH1 to CHm. For example, the memory controller 2222 may transmit commands CMDa~CMDm, addresses ADDRa~ADDRm, and data DATAa~DATAm to the memory device 2224 or receive the data DATAa-~DATAm from the memory device 2224, through the first to mth channels CH1 to CHm.

The memory controller 2222 may select, through a corresponding channel, one of NVM devices connected to the corresponding channel, and transmit and receive signals to and from the selected NVM device. For example, the memory controller 2222 may select the NVM device NVM11 from among the NVM devices NVM11 to NVM1n connected to the first channel CH1. The memory controller 2222 may transmit the command CMDa, the address ADDRa, and the data DATAa to the selected NVM device NVM11, or receive the data DATAa from the selected NVM device NVM11, through the first channel CH1.

The memory controller 2222 may transmit and receive signals to and from the memory device 2224 in parallel through different channels. For example, the memory controller 2222 may transmit the command CMDb to the memory device 2224 through the second channel CH2 while transmitting the command CMDa to the memory device 2224 through the first channel CH1. For example, the memory controller 2222 may receive the data DATAb from the memory device 2224 through the second channel CH2 while receiving the data DATAa from the memory device 2224 through the first channel CH1.

The memory controller 2222 may control a general operation of the memory device 2224. The memory controller 2222 may control each of the plurality of NVM devices NVM11 to NVMmn connected to the first to mth channels CH1 to CHm by transmitting a signal through the first to mth channels CH1 to CHm. For example, the memory controller 2222 may control one selected from among the NVM devices NVM11 to NVM1n, by transmitting the command CMDa and the address ADDRa through the first channel CH1.

Each of the plurality of NVM devices NVM11 to NVMmn may be operated under control of the memory controller 2222. For example, the NVM device NVM11 may program the data DATAa according to the command CMDa, the address ADDRa, and the data DATAa provided through the first channel CH1. For example, the nonvolatile memory device NVM21 may read the data DATAb according to the command CMDb and the address ADDRb provided through the second channel CH2 and transmit the read data DATAb to the memory controller 2222.

Although FIG. 14 shows that the memory device 2224 communicates with the memory controller 2222 through m channels and includes n NVM devices in correspondence to each channel, the number of channels and the number of NVM devices connected to one channel may be variously changed.

Figure 15:
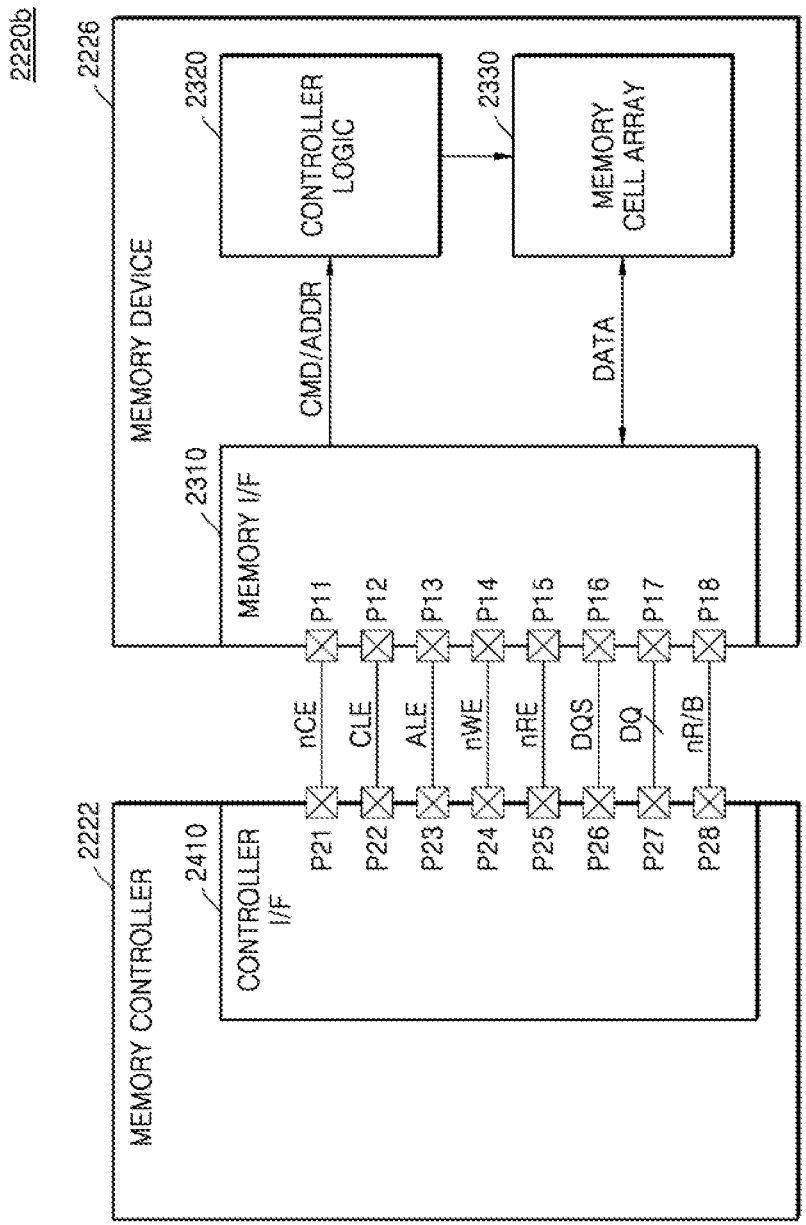
FIG. 15 is a block diagram of an NVM storage 2220$b$ according to an example embodiment.

FIG. 15 is a block diagram of an NVM storage 2220b according to an example embodiment. Referring to FIG. 15, the NVM storage 2220b may include a memory device 2226 and the memory controller 2222. The memory device 2226 may correspond to one of the plurality of NVM devices NVM11 to NVMmn, which communicates with the memory controller 2222 based on one of the first to mth channels CH1 to CHm of FIG. 14. The memory controller 2222 may correspond to the memory controller 2222 of FIG. 14.

The memory device 2226 may include first to eighth pins P11 to P18, a memory interface circuit 2310, a control logic circuit 2320, and a memory cell array 2330.

The memory interface circuit 2310 may receive a chip enable signal nCE from the memory controller 2222 through the first pin P11. The memory interface circuit 2310 may transmit and receive signals to and from the memory controller 2222 through the second to eighth pins P12 to P18 in response to the chip enable signal nCE. For example, when the chip enable signal nCE is in an enable state (e.g., a low level), the memory interface circuit 2310 may transmit and receive signals to and from the memory controller 2222 through the second to eighth pins P12 to P18.

The memory interface circuit 2310 may receive a command latch enable signal CLE, an address latch enable signal ALE, and a write enable signal nWE from the memory controller 2222 through the second to fourth pins P12 to P14, respectively. The memory interface circuit 2310 may receive or transmit a data signal DQ from or to the memory controller 2222 through the seventh pin P17. A command CMD, an address ADDR, and data DATA may be delivered through the data signal DQ. For example, the data signal DQ may be delivered through a plurality of data signal lines. In this case, the seventh pin P17 may include a plurality of pins corresponding to the plurality of data signal lines.

The memory interface circuit 2310 may obtain the command CMD from the data signal DQ received in an enable period (e.g., a high-level state) of the command latch enable signal CLE based on toggle timings of the write enable signal nWE. The memory interface circuit 2310 may obtain the address ADDR from the data signal DQ received in an enable period (e.g., a high-level state) of the address latch enable signal ALE based on toggle timings of the write enable signal nWE.

In an example embodiment, the write enable signal nWE may maintain a static state (e.g., a high level or a low level) and then toggle between the high level and the low level. For example, the write enable signal nWE may toggle in a period in which the command CMD or the address ADDR is transmitted. Thus, the memory interface circuit 2310 may obtain the command CMD or the address ADDR based on toggle timings of the write enable signal nWE.

The memory interface circuit 2310 may receive a read enable signal nRE from the memory controller 2222 through the fifth pin P15. The memory interface circuit 2310 may receive or transmit a data strobe signal DQS from or to the memory controller 2222 through the sixth pin P16.

In a data output operation of the memory device 2226, the memory interface circuit 2310 may receive the read enable signal nRE, which toggles, through the fifth pin P15 before outputting the data DATA. The memory interface circuit 2310 may generate the data strobe signal DQS, which toggles based on the toggling of the read enable signal nRE. For example, the memory interface circuit 2310 may generate the data strobe signal DQS, which starts to toggle after a pre-defined delay (e.g., $t_{DQSRE}$) from a toggling start time of the read enable signal nRE. The memory interface circuit 2310 may transmit the data signal DQ including the data DATA based on toggle timing of the data strobe signal DQS. Thus, the data DATA may be aligned with the toggle timing of the data strobe signal DQS and transmitted to the memory controller 2222.

In a data input operation of the memory device 2226, when the data signal DQ including the data DATA is received from the memory controller 2222, the memory interface circuit 2310 may receive the data strobe signal DQS, which toggles, together with the data DATA from the memory controller 2222. The memory interface circuit 2310 may obtain the data DATA from the data signal DQ based on toggle timing of the data strobe signal DQS. For example, the memory interface circuit 2310 may obtain the data DATA by sampling the data signal DQ at a leading edge and a trailing edge of the data strobe signal DQS.

The memory interface circuit 2310 may transmit a ready/busy output signal nR/B to the memory controller 2222 through the eighth pin P18. The memory interface circuit 2310 may transmit state information of the memory device 2226 to the memory controller 2222 through the ready/busy output signal nR/B. When the memory device 2226 is in a busy state (i.e., while performing internal operations of the memory device 2226), the memory interface circuit 2310 may transmit the ready/busy output signal nR/B indicating the busy state to the memory controller 2222. When the memory device 2226 is in a ready state (i.e., when internal operations of the memory device 2226 are not performed or are completed), the memory interface circuit 2310 may transmit the ready/busy output signal nR/B indicating the ready state to the memory controller 2222. For example, while the memory device 2226 is reading the data DATA from the memory cell array 2330 in response to a page read command, the memory interface circuit 2310 may transmit the ready/busy output signal nR/B indicating the busy state (e.g., the low level) to the memory controller 2222. For example, while the memory device 2226 is programming the data DATA to the memory cell array 2330 in response to a program command, the memory interface circuit 2310 may transmit the ready/busy output signal nR/B indicating the busy state to the memory controller 2222.

The control logic circuit 2320 may generally control various kinds of operations of the memory device 2226. The control logic circuit 2320 may receive the command/address CMD/ADDR from the memory interface circuit 2310. The control logic circuit 2320 may generate control signals for controlling the other components in the memory device 2226, in response to the received command/address CMD/ADDR. For example, the control logic circuit 2320 may generate various kinds of control signals for programming or reading the data DATA to or from the memory cell array 2330.

The memory cell array 2330 may store the data DATA obtained from the memory interface circuit 2310, under control of the control logic circuit 2320. The memory cell array 2330 may output the stored data DATA to the memory interface circuit 2310 under control of the control logic circuit 2320.

The memory cell array 2330 may include a plurality of memory cells. For example, the plurality of memory cells may be flash memory cells. However, embodiments are not limited thereto, and the plurality of memory cells may be RRAM cells, ferroelectric random access memory (FRAM) cells, PRAM cells, thyristor random access memory (TRAM) cells, or MRAM cells. Hereinafter, example embodiments will be described based on an embodiment in which the plurality of memory cells are NAND flash memory cells.

The memory controller 2222 may include first to eighth pins P21 to P28 and a controller interface circuit 2410. The first to eighth pins P21 to P28 may correspond to the first to eighth pins P11 to P18 in the memory device 2226.

The controller interface circuit 2410 may transmit the chip enable signal nCE to the memory device 2226 through the first pin P21. The controller interface circuit 2410 may transmit and receive, through the second to eighth pins P22 to P28, signals to and from the memory device 2226 selected based on the chip enable signal nCE.

The controller interface circuit 2410 may transmit the command latch enable signal CLE, the address latch enable signal ALE, and the write enable signal nWE to the memory device 2226 through the second to fourth pins P22 to P24, respectively. The controller interface circuit 2410 may transmit or receive the data signal DQ to or from the memory device 2226 through the seventh pin P27.

The controller interface circuit 2410 may transmit, to the memory device 2226, the data signal DQ including the command CMD or the address ADDR together with the write enable signal nWE, which toggles. The controller interface circuit 2410 may transmit the data signal DQ including the command CMD to the memory device 2226 according to transmission of the command latch enable signal CLE having an enable state, and transmit the data signal DQ including the address ADDR to the memory device 2226 according to transmission of the address latch enable signal ALE having an enable state.

The controller interface circuit 2410 may transmit the read enable signal nRE to the memory device 2226 through the fifth pin P25. The controller interface circuit 2410 may receive or transmit the data strobe signal DQS from or to the memory device 2226 through the sixth pin P26.

In a data output operation of the memory device 2226, the controller interface circuit 2410 may generate the read enable signal nRE, which toggles, and transmit the read enable signal nRE to the memory device 2226. For example, the controller interface circuit 2410 may generate the read enable signal nRE, which changes from the static state (e.g., the high level or the low level) to a toggle state, before the data DATA is output. Thus, the memory device 2226 may generate the data strobe signal DQS, which toggles based on the read enable signal nRE. The controller interface circuit 2410 may receive, from the memory device 2226, the data signal DQ including the data DATA together with the data strobe signal DQS, which toggles. The controller interface circuit 2410 may obtain the data DATA from the data signal DQ based on toggle timing of the data strobe signal DQS.

In a data input operation of the memory device 2226, the controller interface circuit 2410 may generate the data strobe signal DQS, which toggles. For example, the controller interface circuit 2410 may generate the data strobe signal DQS, which changes from the static state (e.g., the high level or the low level) to the toggle state, before the data DATA is transmitted. The controller interface circuit 2410 may transmit the data signal DQ including the data DATA to the memory device 2226 based on toggle timings of the data strobe signal DQS.

The controller interface circuit 2410 may receive the ready/busy output signal nR/B from the memory device 2226 through the eighth pin P28. The controller interface circuit 2410 may determine state information of the memory device 2226 based on the ready/busy output signal nR/B.

Figure 16:
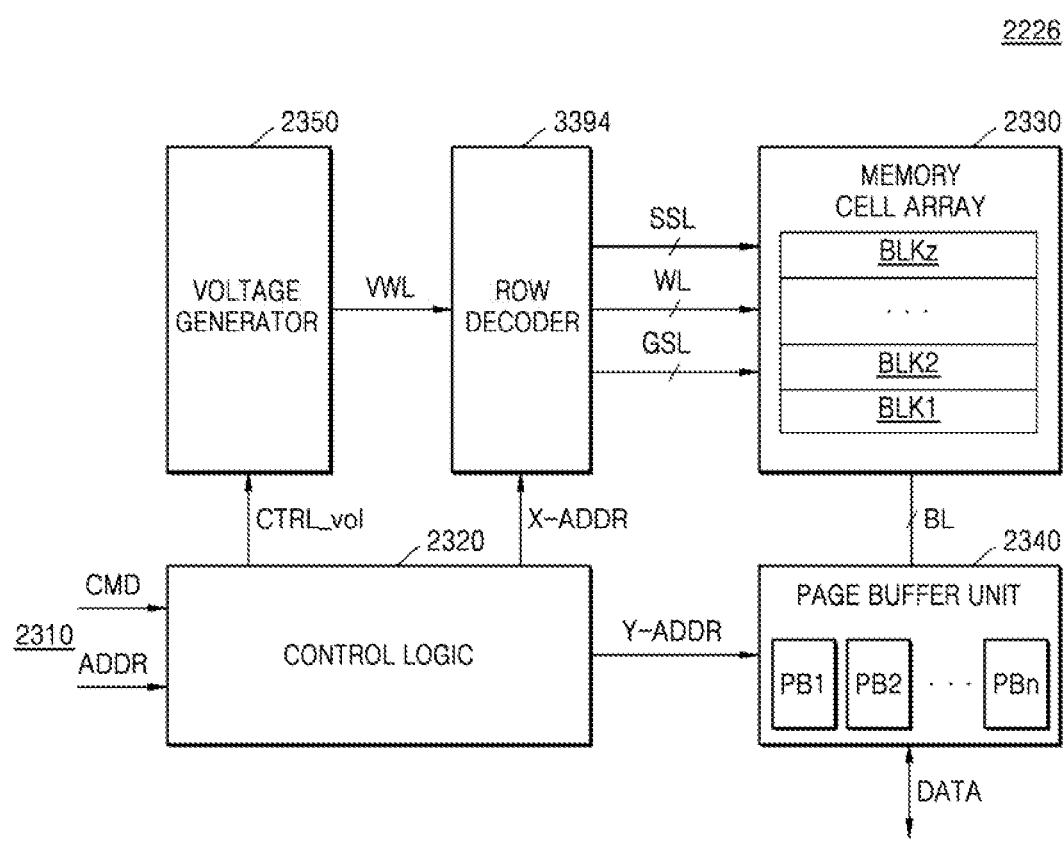
FIG. 16 is a block diagram of the memory device 2226 of FIG. 15.

FIG. 16 is a block diagram of the memory device 2226 of FIG. 15. Referring to FIG. 16, the memory device 2226 may include the control logic circuit 2320, the memory cell array 2330, a page buffer unit 2340, a voltage generator 2350, and a row decoder 3394. Although not shown in FIG. 16, the memory device 2226 may further include the memory interface circuit 2310 shown in FIG. 15 and in addition, the memory device 2226 may further include a column logic, a pre-decoder, a temperature sensor, a command decoder, an address decoder, and the like.

The control logic circuit 2320 may generally control various kinds of operations of the memory device 2226. The control logic circuit 2320 may output various kinds of control signals in response to the command CMD and/or the address ADDR from the memory interface circuit 2310. For example, the control logic circuit 2320 may output a voltage control signal CTRL_vol, a row address X-ADDR, and a column address Y-ADDR.

The memory cell array 2330 may include a plurality of memory blocks BLK1 to BLKz (z is a positive integer), and each of the plurality of memory blocks BLK1 to BLKz may include a plurality of memory cells. The memory cell array 2330 may be connected to the page buffer unit 2340 through bit lines BL and connected to the row decoder 3394 through word lines WL, string select lines SSL, and ground select lines GSL.

In an example embodiment, the memory cell array 2330 may include a 3D memory cell array, and the 3D memory cell array may include a plurality of NAND strings. Each NAND string may include memory cells respectively connected to word lines vertically stacked on a substrate. U.S. Pat. Nos. 7,679,133, 8,553,466, 8,654,587, and 8,559,235 and U.S. Patent Application Publication No. 2011/0233648 are herein incorporated in their entirety by reference. In an example embodiment, the memory cell array 2330 may include a 2D memory cell array, and the 2D memory cell array may include a plurality of NAND strings arranged in row and column directions.

The page buffer unit 2340 may include a plurality of page buffers PB1 to PBn (n is an integer greater than or equal to 3), and the plurality of page buffers PB1 to PBn may be connected to memory cells through a plurality of bit lines BL, respectively. The page buffer unit 2340 may select at least one bit line BL from among the plurality of bit lines BL in response to the column address Y-ADDR. The page buffer unit 2340 may operate as a write driver or a sense amplifier according to an operation mode. For example, in a program operation, the page buffer unit 2340 may apply, to a selected bit line BL, a bit line voltage corresponding to data to be programmed. In a read operation, the page buffer unit 2340 may sense data stored in a memory cell by sensing a current or a voltage of a selected bit line BL.

The voltage generator 2350 may generate various types of voltages for performing program, read, and discard operations based on the voltage control signal CTRL_vol. For example, the voltage generator 2350 may generate a program voltage, a read voltage, a program verify voltage, a discard voltage, or the like as a word line voltage VWL.

The row decoder 3394 may select one of a plurality of word lines WL in response to the row address X-ADDR and select one of a plurality of string select lines SSL. For example, in a program operation, the row decoder 3394 may apply the program voltage and the program verify voltage to a selected word line WL, and in a read operation, the row decoder 3394 may apply the read voltage to a selected word line WL.

Figure 17:
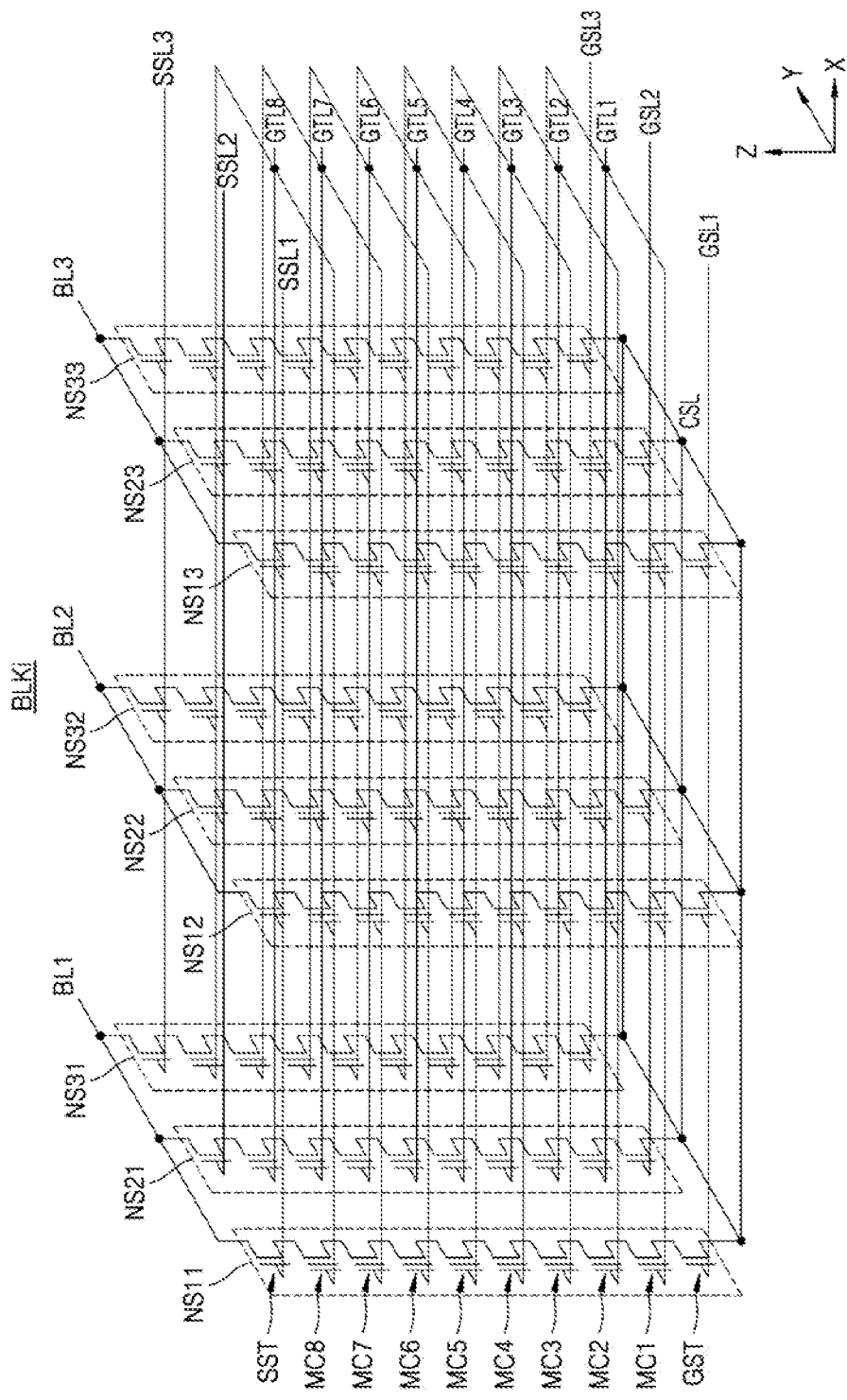
FIG. 17 is a diagram for describing a 3D V-NAND structure applicable to a UFS device, according to an example embodiment.

FIG. 17 is a diagram for describing a 3D V-NAND structure applicable to a UFS device, according to an example embodiment. When a storage module in the UFS device is implemented by 3D V-NAND-type flash memory, each of a plurality of memory blocks included in the storage module may be represented by an equivalent circuit as shown in FIG. 17. A memory block BLKi shown in FIG. 17 indicates a 3D memory block formed in a 3D structure. A plurality of memory NAND strings in the memory block BLKi may be formed in a direction vertical to a substrate.

Referring to FIG. 17, the memory block BLKi may include a plurality of memory NAND strings NS11 to NS33 connected between bit lines BL1, BL2, and BL3 and a common source line CSL. Each of the plurality of memory NAND strings NS11 to NS33 may include a string select transistor SST, a plurality of memory cells MC1, MC2, . . . , MC8, and a ground select transistor GST. Although FIG. 17 shows that each of the plurality of memory NAND strings NS11 to NS33 includes eight memory cells MC1, MC2, . . . , MC8, embodiments are not limited thereto.

The string select transistor SST may be connected to a corresponding string select line SSL1, SSL2, or SSL3. The plurality of memory cells MC1, MC2, . . . , MC8 may be connected to corresponding gate lines GTL1, GTL2, . . . , GTL8, respectively. The gate lines GTL1, GTL2, . . . GTL8 may correspond to word lines, and some of the gate lines GTL1, GTL2, . . . , GTL8 may correspond to dummy word lines. The ground select transistor GST may be connected to a corresponding ground select line GSL1, GSL2, or GSL3. The string select transistor SST may be connected to a corresponding bit line BL1, BL2, or BL3, and the ground select transistor GST may be connected to the common source line CSL.

A word line (e.g., WL1) of the same height may be commonly connected, and the ground select lines GSL1, GSL2, and GSL3 and the string select lines SSL1, SSL2, and SSL3 may be individually separated. Although FIG. 17 shows that the memory block BLKi is connected to eight gate lines GTL1, GTL2, . . . , GTL8 and three bit lines BL1, BL2, and BL3, embodiments are not limited thereto.

Figure 18:
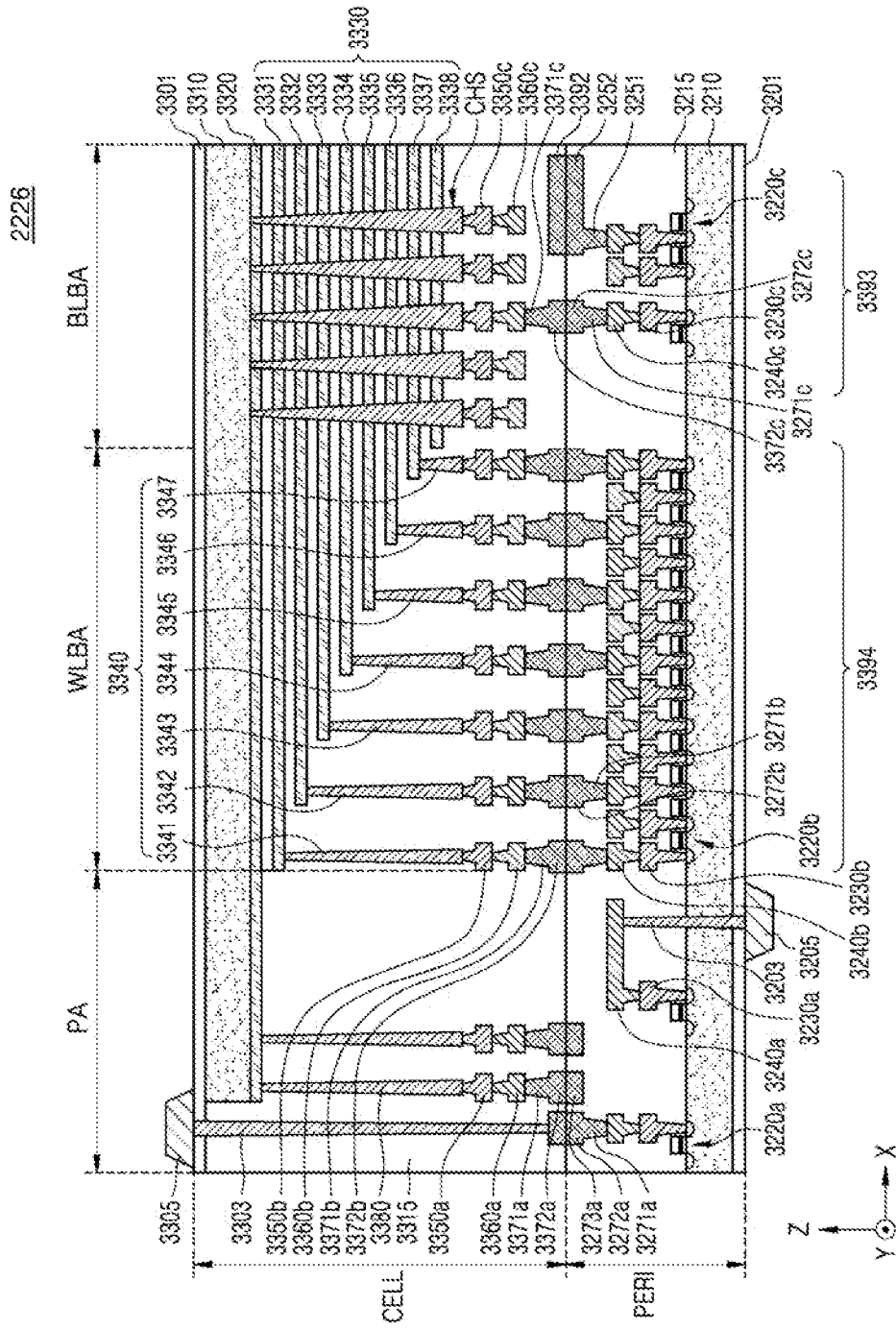
FIG. 18 is a cross-sectional view of a BVNAND structure applicable to a UFS device, according to an example embodiment.

FIG. 18 is a cross-sectional view of a bonding vertical NAND (BVNAND) structure applicable to a UFS device, according to an example embodiment.

Referring to FIG. 18, a memory device 2226 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals include copper (Cu), the upper and lower chips may be bonded together using a Cu-to-Cu bonding. The present example embodiment, however, is not limited thereto. For example, the bonding metals may also be formed of aluminum (Al) or tungsten (W).

Each of the peripheral circuit region PERI and the cell region CELL of the memory device 2226 may include an external pad bonding area PA, a word line bonding area WLBA, and a bit line bonding area BLBA.

The peripheral circuit region PERI may include a first substrate 3210, an interlayer insulating layer 3215, a plurality of circuit elements 3220a, 3220b, and 3220c formed on the first substrate 3210, first metal layers 3230a, 3230b, and 3230c respectively connected to the plurality of circuit elements 3220a, 3220b, and 3220c, and second metal layers 3240a, 3240b, and 3240c formed on the first metal layers 3230a, 3230b, and 3230c. The first metal layers 3230a, 3230b, and 3230c may be formed of tungsten having relatively high electrical resistivity, and the second metal layers 3240a, 3240b, and 3240c may be formed of copper having relatively low electrical resistivity.

In FIG. 18, although only the first metal layers 3230a, 3230b, and 3230c and the second metal layers 3240a, 3240b, and 3240c are shown, one or more additional metal layers may be further formed on the second metal layers 3240a, 3240b, and 3240c. At least a portion of the one or more additional metal layers formed on the second metal layers 3240a, 3240b, and 3240c may be formed of aluminum or the like having a lower electrical resistivity than those of copper forming the second metal layers 3240a, 3240b, and 3240c.

The interlayer insulating layer 3215 may be disposed on the first substrate 3210, and may cover the plurality of circuit elements 3220a, 3220b, and 3220c, the first metal layers 3230a, 3230b, and 3230c, and the second metal layers 3240a, 3240b, and 3240c. The interlayer insulating layer 3215 may include an insulating material such as silicon oxide, silicon nitride, or the like.

Lower bonding metals 3271b and 3272b may be formed on the second metal layer 3240b in the word line bonding area WLBA. In the word line bonding area WLBA, the lower bonding metals 3271b and 3272b in the peripheral circuit region PERI may be electrically bonded to upper bonding metals 3371b and 3372b of the cell region CELL. The lower bonding metals 3271b and 3272b and the upper bonding metals 3371b and 3372b may be formed of aluminum, copper, tungsten, or the like. The upper bonding metals 3371b and 3372b in the cell region CELL may be referred as first metal pads. The lower bonding metals 3271b and 3272b in the peripheral circuit region PERI may be referred as second metal pads.

The cell region CELL may include at least one memory block. The cell region CELL may include a second substrate 3310 and a common source line 3320. On the second substrate 3310, a plurality of word lines 3331 to 3338 (i.e., 3330) may be stacked in a direction (a Z-axis direction), perpendicular to an upper surface of the second substrate 3310. At least one string select line and at least one ground select line may be arranged on and below the plurality of word lines 3330, respectively, and the plurality of word lines 3330 may be disposed between the at least one string select line and the at least one ground select line.

In the bit line bonding area BLBA, a channel structure CH may extend in a direction (a Z-axis direction), perpendicular to the upper surface of the second substrate 3310, and pass through the plurality of word lines 3330, the at least one string select line, and the at least one ground select line. The channel structure CH may include a data storage layer, a channel layer, a buried insulating layer, and the like. The channel layer may be electrically connected to a first metal layer 3350c and a second metal layer 3360c. For example, the first metal layer 3350c may be a bit line contact, and the second metal layer 3360c may be a bit line. The bit line 3360c may extend in a first direction (a Y-axis direction), parallel to the upper surface of the second substrate 3310.

In FIG. 18, an area in which the channel structure CH, the bit line 3360c, and the like are disposed may be defined as the bit line bonding area BLBA. In the bit line bonding area BLBA, the bit line 3360c may be electrically connected to the circuit elements 3220c (which may provide a page buffer 3393) in the peripheral circuit region PERI. The bit line 3360c may be connected to upper bonding metals 3371c and 3372c in the cell region CELL. The upper bonding metals 3371c and 3372c may be connected to lower bonding metals 3271c and 3272c connected to the circuit elements 3220c of the page buffer 3393.

In the word line bonding area WLBA, the plurality of word lines 3330 may extend in a second direction (an X-axis direction), parallel to the upper surface of the second substrate 3310 and perpendicular to the first direction, and may be connected to a plurality of cell contact plugs 3341 to 3347 (i.e., 3340). The plurality of word lines 3330 and the plurality of cell contact plugs 3340 may be connected to each other in pads provided by at least a portion of the plurality of word lines 3330 extending in different lengths in the second direction. A first metal layer 3350b and a second metal layer 3360b may be connected to an upper portion of the plurality of cell contact plugs 3340 connected to the plurality of word lines 3330, sequentially. The plurality of cell contact plugs 3340 may be connected to the peripheral circuit region PERI by the upper bonding metals 3371b and 3372b of the cell region CELL and the lower bonding metals 3271b and 3272b of the peripheral circuit region PERI in the word line bonding area WLBA.

The plurality of cell contact plugs 3340 may be electrically connected to the circuit elements 3220b forming a row decoder 3394 in the peripheral circuit region PERI. In an example embodiment, operating voltages of the circuit elements 3220b of the row decoder 3394 may be different than operating voltages of the circuit elements 3220c forming the page buffer 3393. For example, operating voltages of the circuit elements 3220c forming the page buffer 3393 may be greater than operating voltages of the circuit elements 3220b forming the row decoder 3394.

A common source line contact plug 3380 may be disposed in the external pad bonding area PA. The common source line contact plug 3380 may be formed of a conductive material such as a metal, a metal compound, polysilicon, or the like, and may be electrically connected to the common source line 3320. A first metal layer 3350a and a second metal layer 3360a may be stacked on an upper portion of the common source line contact plug 3380, sequentially. An area in which the common source line contact plug 3380, the first metal layer 3350a, and the second metal layer 3360a are disposed may be defined as the external pad bonding area PA.

Input-output pads 3205 and 3305 may be disposed in the external pad bonding area PA. Referring to FIG. 18, a lower insulating film 3201 covering a lower surface of the first substrate 3210 may be formed below the first substrate 3210, and a first input-output pad 3205 may be formed on the lower insulating film 3201. The first input-output pad 3205 may be connected to at least one of the plurality of circuit elements 3220a, 3220b, and 3220c disposed in the peripheral circuit region PERI through a first input-output contact plug 3203, and may be separated from the first substrate 3210 by the lower insulating film 3201. In addition, a side insulating film may be disposed between the first input-output contact plug 3203 and the first substrate 3210 to electrically separate the first input-output contact plug 3203 and the first substrate 3210.

An upper insulating film 3301 covering the upper surface of the second substrate 3310 may be formed on the second substrate 3310, and a second input-output pad 3305 may be disposed on the upper insulating film 3301. The second input-output pad 3305 may be connected to at least one of the plurality of circuit elements 3220a, 3220b, and 3220c disposed in the peripheral circuit region PERI through a second input-output contact plug 3303. The second input-output pad 3305 may be electrically connected to a circuit element 3220a.

The second substrate 3310 and the common source line 3320 may not be disposed in an area in which the second input-output contact plug 3303 is disposed. The second input-output pad 3305 may not overlap the word lines 3330 in the third direction (the Z-axis direction). The second input-output contact plug 3303 may be separated from the second substrate 3310 in a direction, parallel to the upper surface of the second substrate 3310, and may pass through the interlayer insulating layer 3315 of the cell region CELL to be connected to the second input-output pad 3305.

In an example embodiment, the first input-output pad 3205 and the second input-output pad 3305 may be selectively formed. For example, the memory device 2226 may include only the first input-output pad 3205 disposed on the first substrate 3210 or the second input-output pad 3305 disposed on the second substrate 3310. Alternatively, the memory device 2226 may include both the first input-output pad 3205 and the second input-output pad 3305.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 2226 may include a lower metal pattern 3273a, corresponding to an upper metal pattern 3372a formed in an uppermost metal layer of the cell region CELL, and having the same cross-sectional shape as the upper metal pattern 3372a of the cell region CELL so as to be connected to each other, in an uppermost metal layer of the peripheral circuit region PERI. In the peripheral circuit region PERI, the lower metal pattern 3273a formed in the uppermost metal layer of the peripheral circuit region PERI may not be connected to a contact. Similarly, in the external pad bonding area PA, an upper metal pattern 3372a, corresponding to the lower metal pattern 3273a formed in an uppermost metal layer of the peripheral circuit region PERI, and having the same shape as a lower metal pattern 3273a of the peripheral circuit region PERI, may be formed in an uppermost metal layer of the cell region CELL.

The lower bonding metals 3271b and 3272b may be formed on the second metal layer 3240b in the word line bonding area WLBA. In the word line bonding area WLBA, the lower bonding metals 3271b and 3272b of the peripheral circuit region PERI may be electrically connected to the upper bonding metals 3371b and 3372b of the cell region CELL by Cu-to-Cu bonding.

In the bit line bonding area BLBA, an upper metal pattern 3392 (corresponding to a lower metal pattern 3252 formed in the uppermost metal layer of the peripheral circuit region PERI, and having the same cross-sectional shape as the lower metal pattern 3252 of the peripheral circuit region PERI) may be formed in an uppermost metal layer of the cell region CELL. A contact may not be formed on the upper metal pattern 3392 formed in the uppermost metal layer of the cell region CELL.

A reinforcement metal pattern (corresponding to a metal pattern formed in an uppermost metal layer in one of the cell region CELL and the peripheral circuit region PERI) having the same cross-sectional shape as the metal pattern may be formed in an uppermost metal layer in the other one of the cell region CELL and the peripheral circuit region PERI. A contact may not be formed on the reinforcement metal pattern.

By way of summation and review, a storage device may provide a host with a protected region for storing data that is intended to remain secure, and may permit only authenticated access to the protected region. Attacks may be made on the storage device and/or the host to acquire and/or change data stored in the protected region, or to insert an error in access to the protected region. Therefore, it may be desirable to securely authenticate access to, and operations in, the protected region.

A storage device using an interface such as a universal flash storage (UFS) or an embedded multi-media card (eMMC) may define a relay protected memory block (RPMB) as a region that is protected from a relay attack. A host may store, in the RPMB, data that is intended to remain secure. The storage device may allow only an authenticated access to the RPMB. A write count and a nonce may be used to authenticate an access to the RPMB. Example embodiments may use a nonce to protect a data write operation with respect to an RPMB from MITM attacks, rather than using a nonce only for a read operation with respect to an RPMB, and thus an access to an RPMB may be protected from MITM attacks. The host may generate a nonce for a write request, and provide the write request including the generated nonce to the storage device. The storage device may verify the write request based on the nonce included in the write request. When a nonce included in a previous write request is identical to a nonce included in a current write request, the storage device may determine a failure of verification of the current write request. The storage device may provide the host with a response including the nonce extracted from the write request, and the host may verify an MAC and determine whether the nonce included in the response is identical to a nonce having been included in the write request, while verifying the response.

As described above, embodiments may provide a system, device, and method for protecting data from being written to a protected region by attacks.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Thus, it will be understood by those of skill in the art that various changes in form and details may be made without departing from the spirit and scope of the present invention as set forth in the following claims.

What is claimed is:
1. A method of writing data to a protected region in response to a request from a host, the method comprising:
    providing, to the host, a device write count;
    receiving, from the host, a first write request including a first host message authentication code and a first random number, the first host message authentication code being based on a host write count, which is set to be the same as the device write count, and the first random number;
    verifying the first write request based on the device write count and the host write count, the first random number, and the first host message authentication code;
    updating the device write count based on a result of verifying the first write request, the updating of the device write count including incrementing the device write count when the verifying of the first write request succeeds;

generating a first device message authentication code based on the updated device write count and the first random number; and providing the host with a first response including the first device message authentication code and the result of verifying the first write request, wherein the first response further includes the first random number.

2. The method as claimed in claim 1, wherein the updating of the device write count includes:

maintaining the device write count, when the verifying of the first write request fails.

3. The method as claimed in claim 1, further comprising:

receiving a second write request including a second host message authentication code, a second host write count, and a second random number from the host; and verifying the second write request based on the updated device write count, the second random number, and the second host message authentication code.

4. The method as claimed in claim 3, further comprising:

generating a second device message authentication code based on the updated device write count and the second random number; and providing the host with a second response including the second device message authentication code and a result of the verifying of the second write request.

5. The method as claimed in claim 1, wherein the verifying of the first write request includes:

generating a first host message verification code based on the device write count and the first random number; and comparing the first host message verification code with the first host message authentication code.

6. The method as claimed in claim 5, wherein:

the first write request includes a first host write count, and the verifying of the first write request further includes comparing the device write count with the first host write count.

7. The method as claimed in claim 5, wherein:

the generating of the first host message verification code is based on a key shared with the host in advance, the device write count, and the first random number, and the generating of the first device message authentication code is based on the key, the updated write count, and the first random number.

8. A storage device configured to communicate with a host, the storage device comprising:

a memory including a protected region; and a controller, wherein the controller is configured to:

provide, to the host, a device write count, receive, from the host, a first write request including a first host message authentication code and a first random number, the first host message authentication code being based on a host write count, which is set to be the same as the device write count, and the first random number, verify the first write request based on the device write count and the host write count, the first random number, and the first host message authentication code, write data included in the first write request to the protected region when the verifying of the first write request succeeds, update the device write count based on a result of verifying the first write request, the updating of the device write count including incrementing the device write count when the verifying of the first write request succeeds, generate a first device message authentication code based on the updated write count and the first random number, and provide the host with a first response including the first device message authentication code and the result of verifying the first write request, wherein the first response further includes the first random number.

9. The storage device as claimed in claim 8, wherein the controller is further configured to verify the first write request by generating a first host message verification code based on the device write count and the first random number, and comparing the first host message verification code with the first host message authentication code.

10. A method of writing data to a storage device including a protected region, the method comprising:

receiving, at a host, a device write count from the storage device, and setting a host write count to be the same as the device write count;

generating, by the host, a first host message authentication code based on the host write count and a first random number;

providing the storage device with a first write request, the first write request including the first host message authentication code and the first random number;

receiving, at the host, a first response including a first device message authentication code from the storage device;

verifying, at the host, the first response based on an increment value from the host write count, the first random number, and the first device message authentication code, wherein the verifying of the first response includes determining whether the first random number is identical to a random number included in the first response; and updating the host write count based on a result of the verifying of the first response, the updating of the host write count including incrementing the host write count to be the same as the increment value used in the verifying when the verifying of the first response succeeds.

11. The method as claimed in claim 10, wherein the updating of the write count includes:

maintaining the host write count, when the verifying of the first response fails.

12. The method as claimed in claim 10, further comprising:

generating a second random number;

generating a second host message authentication code based on the updated host write count and the second random number; and providing the storage device with a second write request including the second host message authentication code and the second random number.

13. The method as claimed in claim 12, further comprising:

receiving a second response including a second device message authentication code from the storage device; and verifying the second response based on an increment value from the updated host write count, the second random number, and the second device message authentication code.

14. The method as claimed in claim 10, wherein verifying of the first response includes:

generating a first device message verification code based on the increment value from the host write count and the first random number; and comparing the first device message verification code with the first device message authentication code.

15. The method as claimed in claim 14, wherein the verifying of the first response further includes comparing the first random number with a third random number included in the first response.

16. The method as claimed in claim 14, wherein:
the generating of the first host message authentication code is based on a key shared with the storage device in advance, the host write count, and the first random number, and
the generating of the first device message verification code is based on the key, the increment value from the host write count, and the first random number.

* * * * *